(12) United States Patent
Imai et al.

(10) Patent No.: US 11,630,338 B2
(45) Date of Patent: Apr. 18, 2023

(54) DISPLAY DEVICE AND ILLUMINATION DEVICE

(71) Applicant: Japan Display Inc., Tokyo (JP)

(72) Inventors: Takayuki Imai, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 17/335,450

(22) Filed: Jun. 1, 2021

(65) Prior Publication Data

US 2021/0373366 A1 Dec. 2, 2021

(30) Foreign Application Priority Data

Jun. 1, 2020 (JP) .............................. JP2020-095334

(51) Int. Cl.
*G02F 1/1334* (2006.01)
*G09G 3/36* (2006.01)

(52) U.S. Cl.
CPC ............. *G02F 1/1334* (2013.01); *G09G 3/36* (2013.01)

(58) Field of Classification Search
CPC ......... G02F 1/133615; G02F 1/133616; G02F 1/1334; G09G 3/36
See application file for complete search history.

(56) References Cited

U.S. PATENT DOCUMENTS

| | | | |
|---|---|---|---|
| 2010/0085510 A1 | 4/2010 | Okuyama et al. | |
| 2011/0109663 A1 | 5/2011 | Uchida et al. | |
| 2016/0070047 A1 | 3/2016 | Okuyama et al. | |
| 2018/0239189 A1* | 8/2018 | Koito | G02F 1/133512 |
| 2018/0275483 A1* | 9/2018 | Nakanishi | G02F 1/134309 |
| 2019/0129245 A1* | 5/2019 | Nakanishi | G02F 1/133553 |

FOREIGN PATENT DOCUMENTS

| | | |
|---|---|---|
| JP | 2010-92682 A | 4/2010 |
| JP | 5467389 B2 | 4/2014 |
| JP | 2016-57338 A | 4/2016 |

* cited by examiner

*Primary Examiner* — Jia X Pan
(74) *Attorney, Agent, or Firm* — Maier & Maier, PLLC

(57) ABSTRACT

According to one embodiment, a display device includes a display panel, a third transparent substrate, a light-emitting element, and a modulation element. The display panel includes a first transparent substrate, a second transparent substrate, a first liquid crystal layer of a polymer dispersed type held. The third transparent substrate has a first end portion. The light-emitting element is opposed to the first end portion. The modulation element includes a fourth transparent substrate and a fifth transparent substrate disposed between the light-emitting element and the first end portion, a second liquid crystal layer, and control electrodes for applying voltage to the second liquid crystal layer.

7 Claims, 20 Drawing Sheets

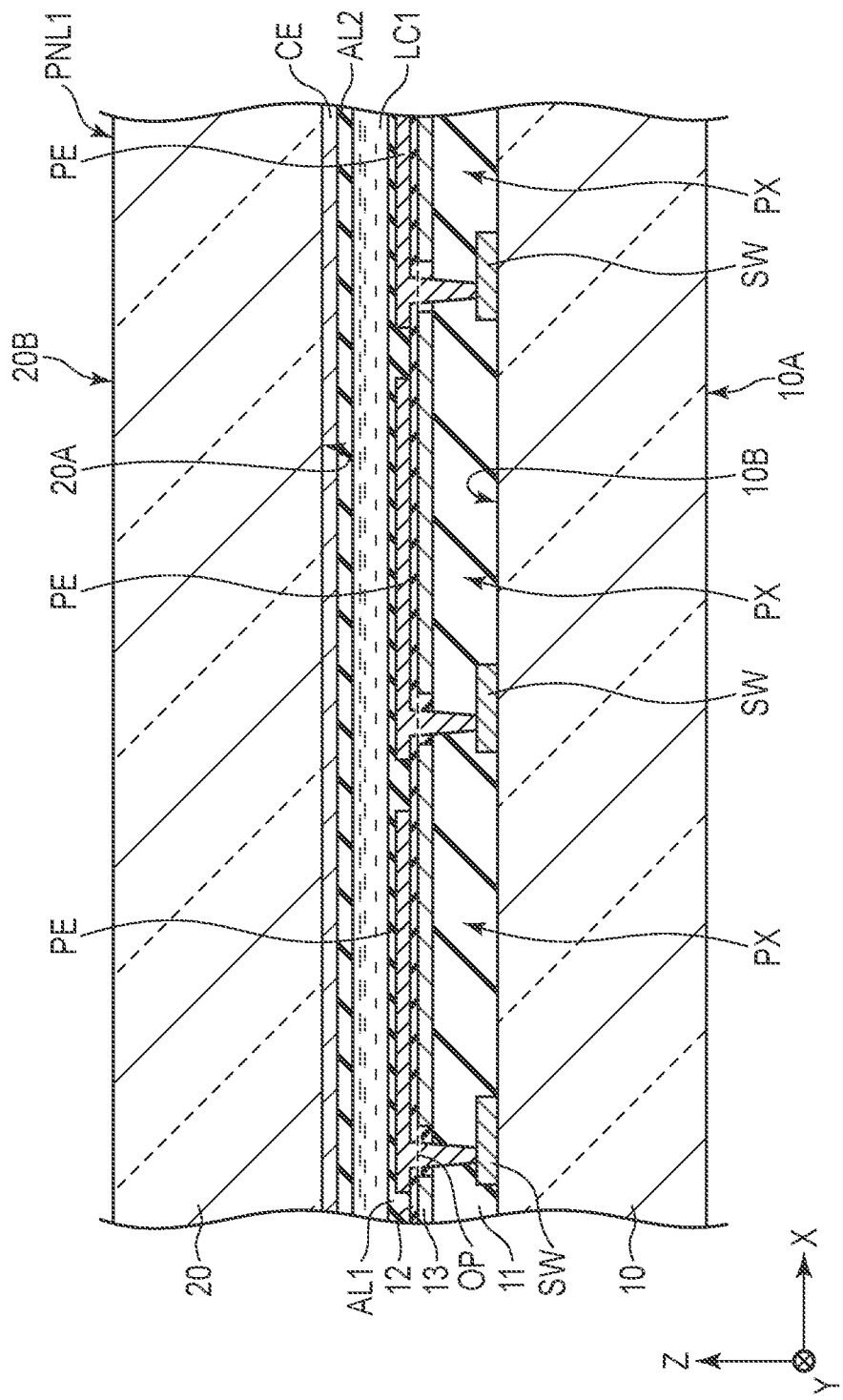
F I G. 3

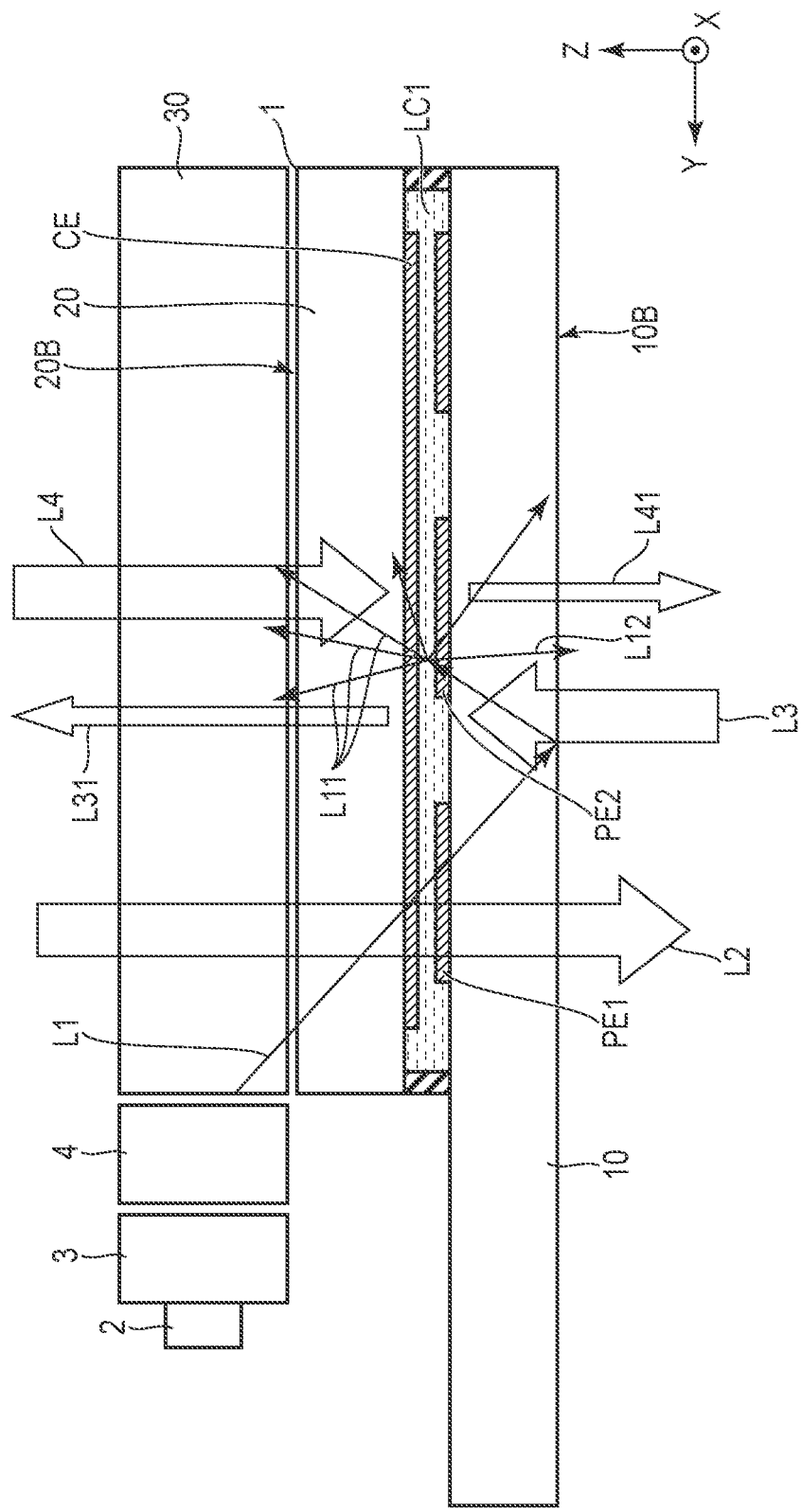
F I G. 4

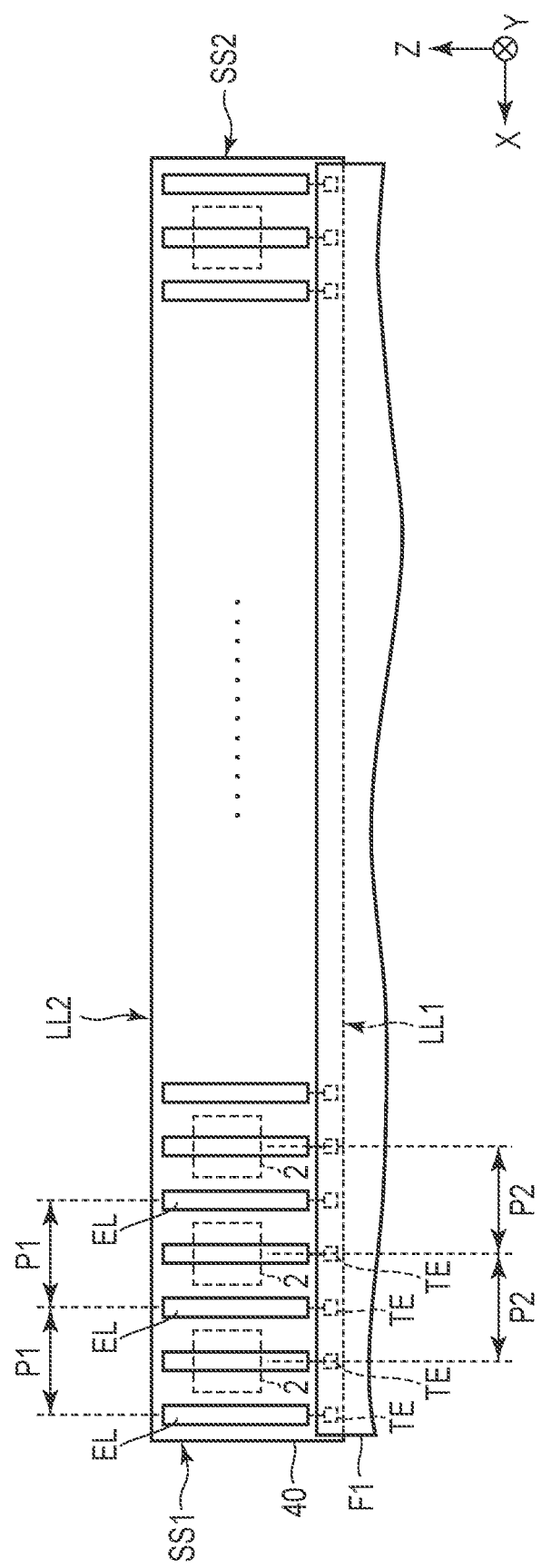
F I G. 6B

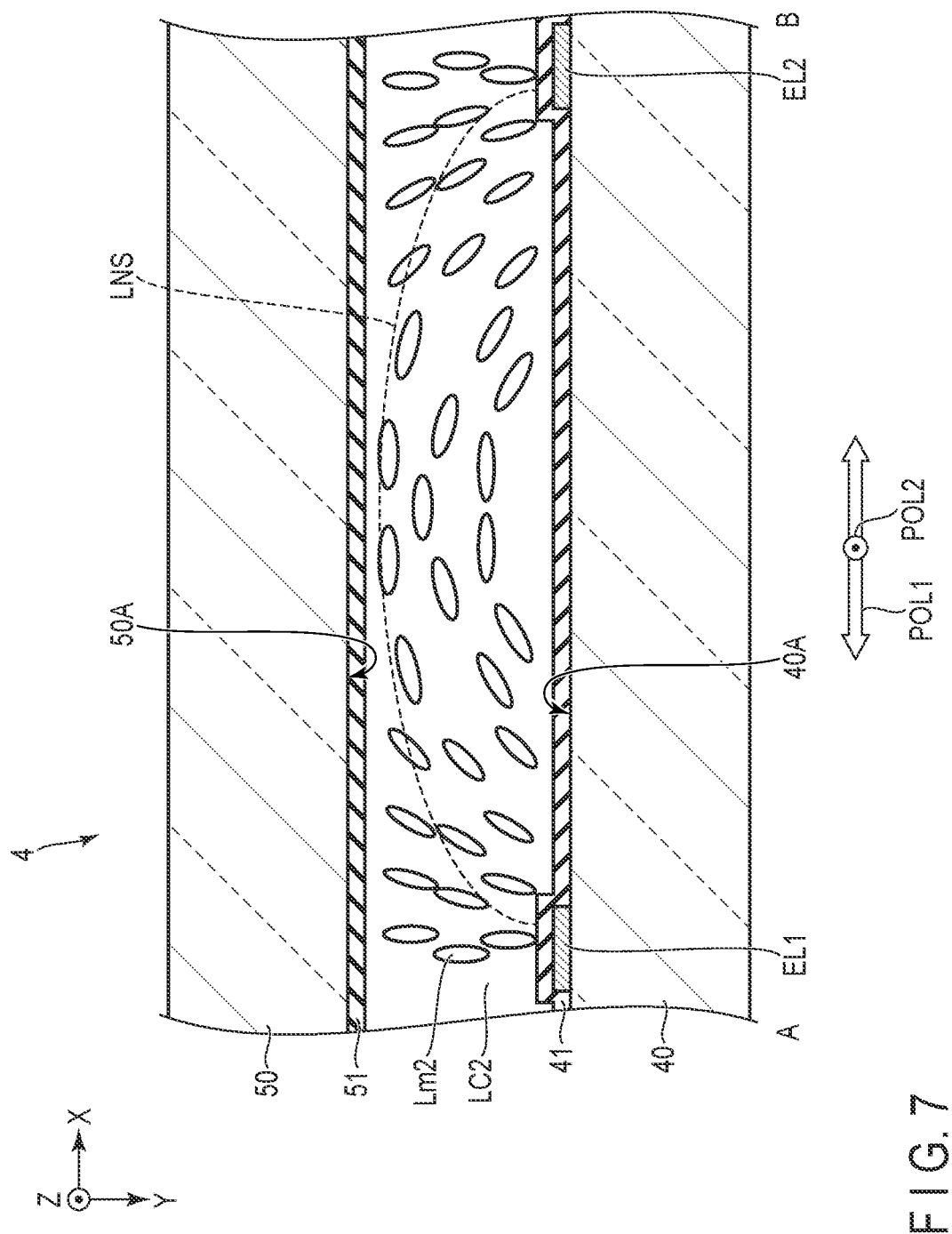
F I G. 7

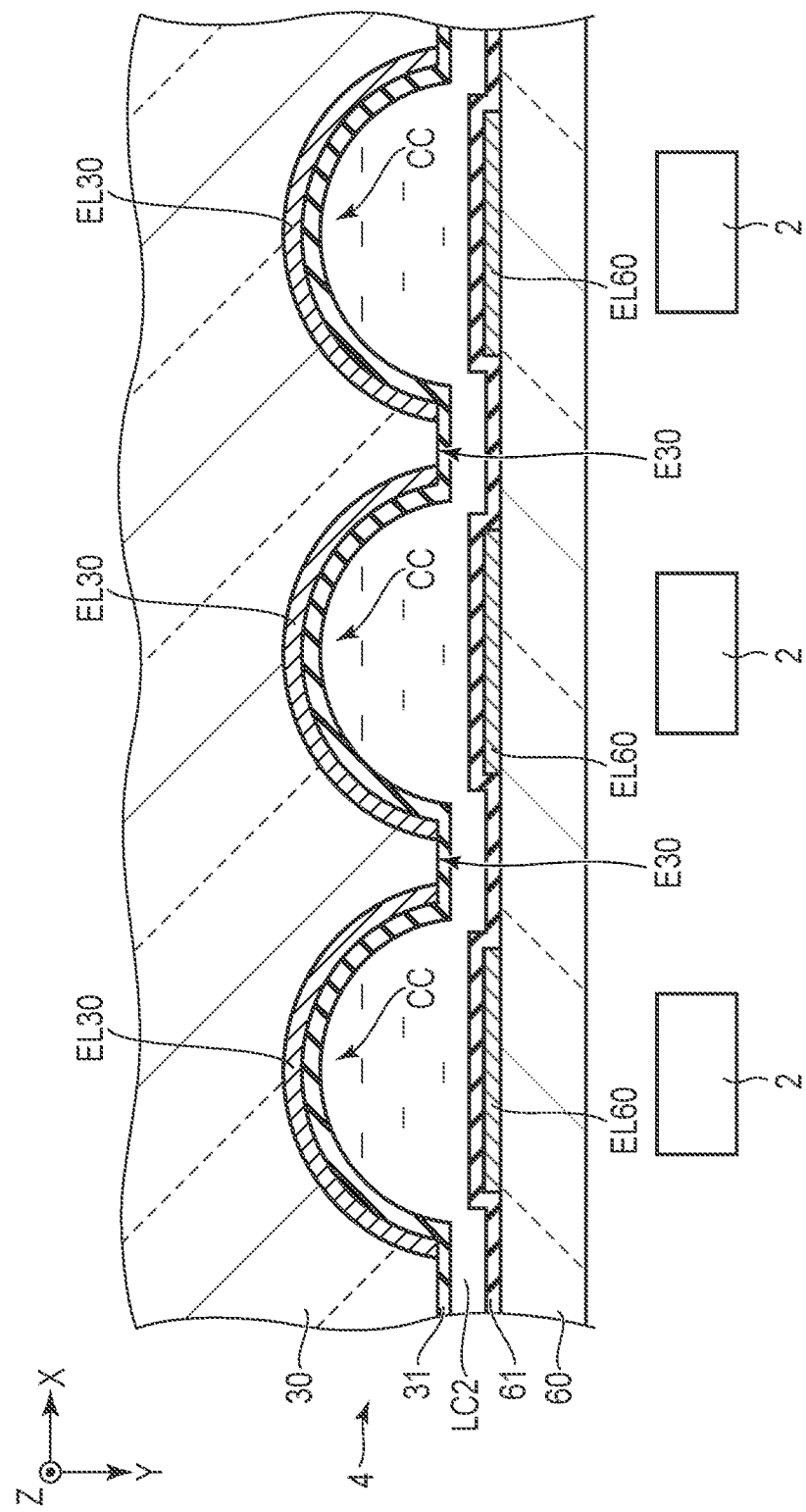
F I G. 12A

DISPLAY DEVICE AND ILLUMINATION DEVICE

CROSS-REFERENCE TO RELATED APPLICATIONS

This application is based upon and claims the benefit of priority from Japanese Patent Application No. 2020-095334, filed Jun. 1, 2020, the entire contents of which are incorporated herein by reference.

FIELD

Embodiments described herein relate generally to a display device and an illumination device.

BACKGROUND

Recently, various display devices using a polymer dispersed liquid crystal (hereinafter referred to also as PDLC) capable of switching between a diffusing state of diffusing incident light and a transmitting state of transmitting incident light have been proposed. In many cases, the display device using the PDLC comprises an illumination device for radiating light to a display panel. As an example of the illumination device, a configuration comprising a light guide facing the display panel and a light-emitting element disposed at an end portion of the light guide is known.

In this display device, light entering the display panel from the illumination device may be scattered by a wiring line and the like. Therefore, when an image is displayed on, for example, a part of the display panel, if light also enters a region in which no image is displayed, degradation of display quality such as impairment of the transparency of the entire display device may occur due to the above-described scattering. However, it is difficult to adjust the spreading of light entering the display panel in this display device.

BRIEF DESCRIPTION OF THE DRAWINGS

FIG. 3 is a cross-sectional view showing a configuration example of the display panel 1 shown in FIG. 2.

FIG. 4 is a cross-sectional view for explaining the operation of the display panel 1.

FIG. 6B is a plan view showing another configuration example of the fourth transparent substrate 40 shown in FIG. 5.

FIG. 7 is a cross-sectional view of the modulation element 4 along line A-B shown in FIG. 6A.

FIG. 12A is a plan view showing a configuration example of the modulation element 4.

DETAILED DESCRIPTION

Figure 1:
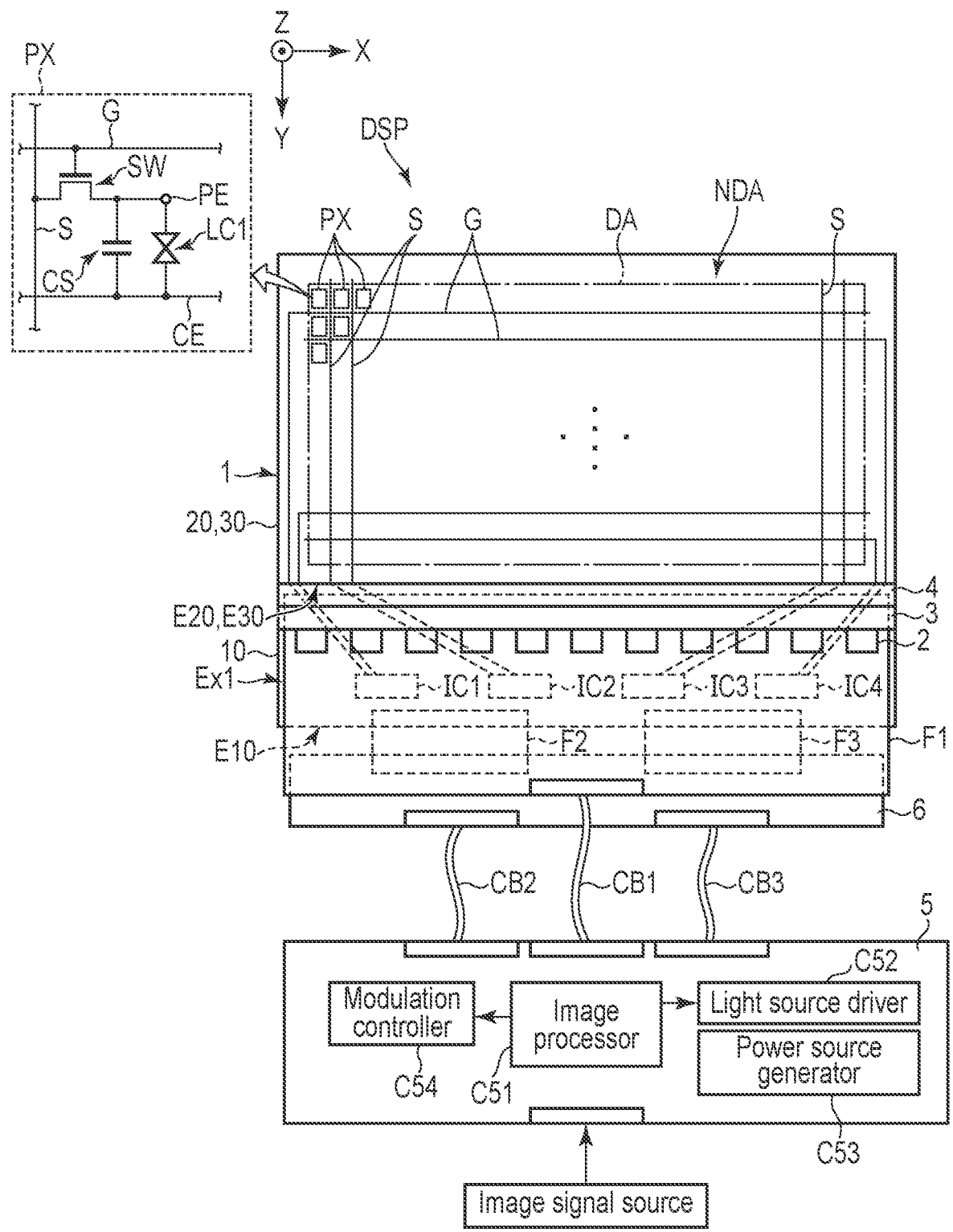
FIG. 1 is a plan view showing an example of the external appearance of a display device DSP according to the first embodiment.

In general, according to one embodiment, there is provided a display device comprising: a display panel comprising a first transparent substrate, a second transparent substrate disposed on the first transparent substrate, and a first liquid crystal layer of a polymer dispersed type held between the first transparent substrate and the second transparent substrate and containing a polymer and liquid crystal molecules; a third transparent substrate disposed on the second transparent substrate and having a first end portion; a light-emitting element opposed to the first end portion; and a modulation element comprising a fourth transparent substrate disposed between the light-emitting element and the first end portion, a fifth transparent substrate disposed between the fourth transparent substrate and the first end portion, a second liquid crystal layer held between the fourth transparent substrate and the fifth transparent substrate, and a plurality of control electrodes for applying voltage to the second liquid crystal layer.

According to another embodiment, there is provided a display device comprising: a display panel comprising a first transparent substrate, a second transparent substrate disposed on the first transparent substrate, and a first liquid crystal layer of a polymer dispersed type held between the first transparent substrate and the second transparent substrate and containing a polymer and liquid crystal molecules; a light-emitting element; a third transparent substrate disposed on the second transparent substrate, and having a first end portion and a concave portion opposed to the light-emitting element and more recessed away from the light-emitting element than the first end portion; a transparent sealing board opposed to the first end portion and the concave portion; and a second liquid crystal layer sealed in the concave portion by the sealing board.

According to yet another embodiment, there is provided an illumination device comprising: a plurality of light-emitting elements arranged along a first direction; a third transparent substrate having an end portion facing the light-emitting elements and a main surface parallel to the first direction and a second direction intersecting the first direction; a fourth transparent substrate and a fifth transparent substrate located between the light-emitting elements and the end portion, and facing each other along the second direction; a second liquid crystal layer held between the fourth transparent substrate and the fifth transparent substrate; and a plurality of control electrodes for applying voltage to the second liquid crystal layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference signs, and detailed descriptions thereof which are considered redundant are omitted unless necessary.

First Embodiment

FIG. 1 is a plan view showing an example of the external appearance of a display device DSP according to the first embodiment. A first direction X, a second direction Y and a third direction Z shown in the drawing are orthogonal to one another but may intersect at an angle other than 90 degrees. The first direction X and the second direction Y correspond to directions parallel to the main surface of a substrate constituting the display device DSP, and the third direction Z corresponds to the thickness direction of the display device DSP. In the present specification, viewing an X-Y plane defined by the first direction X and the second direction Y is referred to as planar view.

In the present embodiment, a display device employing a polymer dispersed liquid crystal will be described an example of the display device. The display device DSP comprises a display panel 1, light-emitting elements 2, an optical element 3, a modulation element 4, a control board 5, a relay board 6, drivers IC1 to IC3, wiring boards F1 to F3, a third transparent substrate 30 and the like.

The display panel 1 has, for example, a quadrangular shape, and has, in the illustrated example, a substantially rectangular shape in which the length of sides parallel to the first direction X is greater than the length of sides parallel to the second direction Y. The display panel 1 comprises a first transparent substrate 10 and a second transparent substrate 20. The first transparent substrate 10 and the second transparent substrate 20 overlap each other in the third direction Z, and hold a polymer dispersed liquid crystal layer (liquid crystal layer LC1 which will be described later) between them. The first transparent substrate 10 has an extension portion (first extension portion) Ex1 extending more outward than the second transparent substrate 20. In the illustrated example, the extension portion Ex1 corresponds to a region between an end portion E20 of the second transparent substrate 20 and an end portion E10 of the first transparent substrate 10. Here, in one example, the end portions E20 and E10 extend in the first direction X.

In a region in which the liquid crystal layer is disposed, the display panel 1 has a display region DA for displaying an image. The display panel 1 comprises a plurality of scanning lines G and a plurality of signal lines S in the display region DA. In one example, the scanning lines G each extend in the first direction X, and are arranged at intervals in the second direction Y. The signal lines S each extend in the second direction Y, and are arranged at intervals in the first direction X. In addition, the display region DA comprises pixels PX arranged in a matrix in the first direction X and the second direction Y.

As shown enlarged in FIG. 1, each pixel PX comprises a switching element SW, a pixel electrode PE, a common electrode CE, a liquid crystal layer LC1 and the like. The switching element SW is composed of, for example, a thin-film transistor (TFT), and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is disposed common to the pixel electrodes PE. The liquid crystal layer LC1 (particularly, liquid crystal molecules contained in the liquid crystal layer LC1) is driven by an electric field produced between the pixel electrode PE and the common electrode CE. A capacitance CS is formed between, for example, an electrode having the same potential as the common electrode CE and an electrode having the same potential as the pixel electrode PE.

In one example, the drivers IC1 to IC4 are mounted in the extension portion Ex1. In the illustrated example, the drivers IC1, IC2, IC3 and IC4 are arranged in this order in the first direction X. The signal lines S are drawn to the non-display region NDA, and are connected to the drivers IC2 and IC3. The scanning lines G are drawn to the non-display region NDA, and are connected to the drivers IC1 and IC4. It should be noted that the number of drivers in the display device DSP and the connection relationship between the signal lines S and scanning lines G and the drivers IC1 to IC4 is not limited to the illustrated example. In addition, at least a part of the drivers IC1 to IC4 may be mounted on another board such as the wiring boards F1 to F3, the control board 5 or the relay board 6.

The light-emitting elements 2 overlap the extension portion Ex1. In the illustrated example, the light-emitting elements 2 are arranged at equal intervals along the first direction X, and are closer to the second transparent substrate 20 than the drivers IC1 to IC4. The light-emitting elements 2 each comprise, for example, a first light-emitting portion which emits light having the first color, a second light-emitting portion which emits light having the second color, and a third light-emitting portion which emits light having the third color. In one example, the first color is red, the second color is green, and the third color is blue.

The optical element 3 overlaps the extension portion Ex1. More specifically, the optical element 3 is located between the light-emitting elements 2 and the third transparent substrate 30. In the illustrated example, the optical element 3 extends along the first direction X, and is opposed to all the light-emitting elements 2. In one example, the optical element 3 converts light entering from the light-emitting elements 2 into parallel light. It should be noted that the optical element 3 may diffuse light entering from the light-emitting elements 2 as needed.

The modulation element 4 overlaps the extension portion Ex1. More specifically, the modulation element 4 is located between the optical element 3 and the third transparent substrate 30. In the illustrated example, the modulation element 4 extends along the first direction X similarly to the optical element 3. The modulation element 4 adjusts the spreading of incident light. For example, the modulation element 4 diffuses light entering via the optical element 3. Alternatively, the modulation element 4 transmits light entering via the optical element 3 without modulating it.

The third transparent substrate 30 overlaps the second transparent substrate 20. In the illustrated example, the third transparent substrate 30 has the same shape as the second transparent substrate 20. The third transparent substrate 30 functions as a light guide which guides light emitted from the light-emitting elements 2 for illuminating the display panel 1. The light emitted from the light-emitting elements 2 enters the third transparent substrate 30 from the end portion E30 via the optical element 3 and the modulation element 4. In the illustrated example, the end portion E30 overlaps the end portion E20 of the second transparent substrate 20 in the third direction Z.

The control board 5 comprises an image processor C51, a light source driver C52, a power source generator C53, a modulation controller C54 and the like.

The image processor C51 includes a timing controller. The image processor C51 generates various signals based on image data, a synchronization signal and the like which are input from the outside. In one example, the image processor C51 outputs an image signal generated through predetermined signal processing of the image data to the drivers IC2 and IC3. In addition, the image processor C51 outputs a control signal generated based on the synchronization signal to each of the drivers IC1 to IC4, the light source driver C52 and the modulation controller C54.

The light source driver C52 controls the lighting period of the light-emitting element 2 according to the control signal from the image processor C51 and the like. In a drive method in which one frame period has a plurality of subframes (fields), at least one of the above-described three light-emitting portions is turned on in each subframe, and the color of illumination light is switched every subframe.

The modulation controller C54 controls the modulation element 4 according to the control signal from the image processor C51 and the like. For example, the modulation controller C54 diffuses at least a part of light entering the modulation element 4 from the optical element 3. Alternatively, the modulation controller C54 transmits at least a part of light entering the modulation element 4 from the optical element 3 without modulating it.

The wiring board F1 is electrically connected to the light-emitting elements 2 and the modulation element 4. In the illustrated example, the wiring board F1 overlaps the modulation element 4, the optical element 3 and the light-emitting elements 2, and extends more outward than the first transparent substrate 10. The wiring board F1 is electrically connected to the control board 5 via a cable CB1. Therefore, the light-emitting elements 2 and the modulation element 4 are controlled based on signals supplied from the light source driver C52 and the modulation controller C54 via the wiring board F1 and the cable CB1.

The wiring boards F2 and F3 electrically connect the extension portion Ex1 and the relay board 6. The relay board 6 is electrically connected to the control board 5 via cables CB2 and CB3. Therefore, the drivers IC1 to IC4 are controlled based on the control signal supplied from the image processor C51 via the wiring boards F2 and F3, the relay board 6 and the cables CB2 and CB3.

Figure 2:
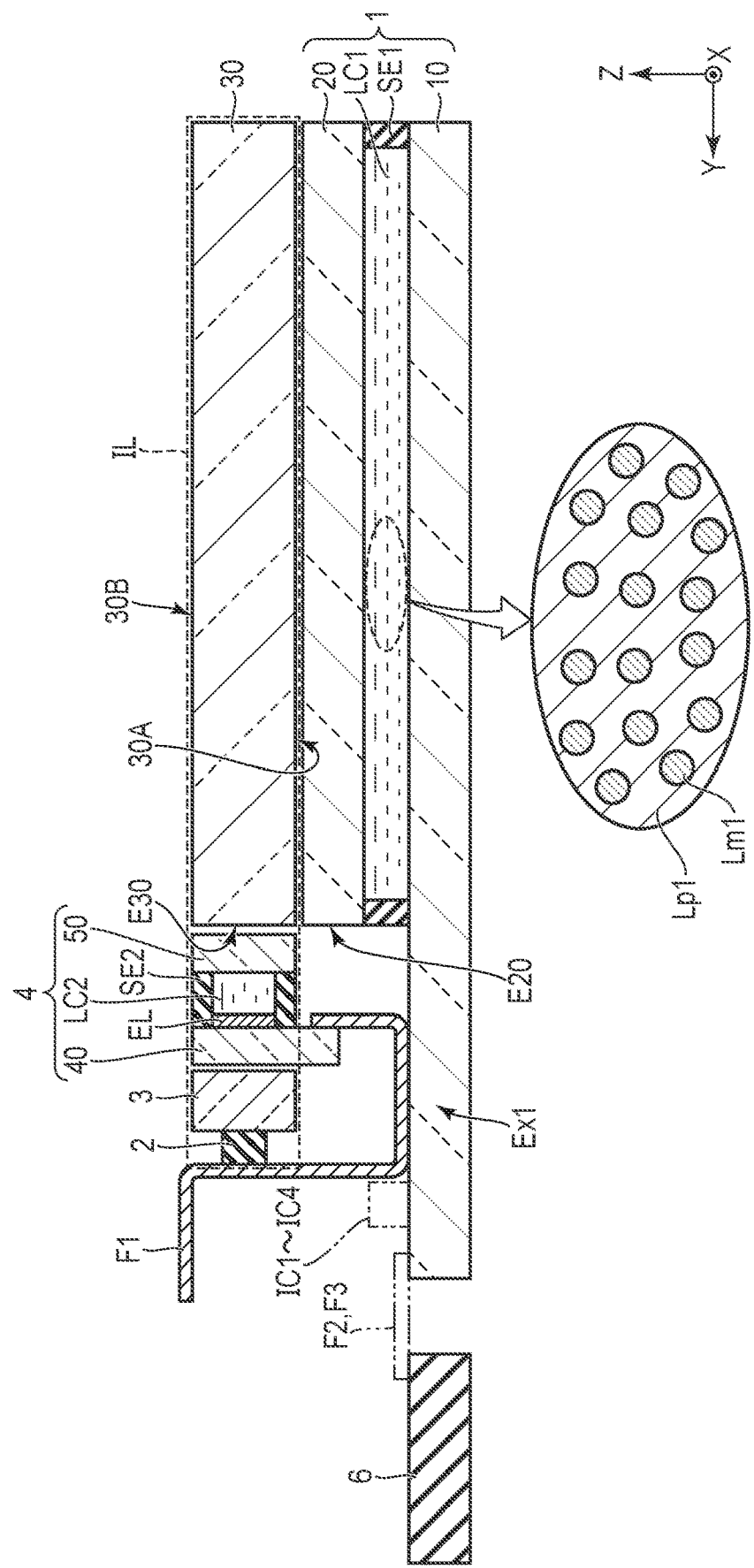
FIG. 2 is a side view of the display device DSP shown in FIG. 1.

FIG. 2 is a side view of the display device DSP shown in FIG. 1. FIG. 2 shows a plane parallel to a Y-Z plane defined by the second direction Y and the third direction Z.

The display panel 1 comprises a sealant SE1 and a liquid crystal layer LC1 in addition to the first transparent substrate 10 and the second transparent substrate 20. The first transparent substrate 10 and the second transparent substrate 20 are bonded together by the sealant SE1. The liquid crystal layer LC1 is held inside a region surrounded by the sealant SE1 between the first transparent substrate 10 and the second transparent substrate 20. The liquid crystal layer LC1 is formed of a polymer dispersed liquid crystal containing a polymer Lp1 which is a macromolecular compound, and liquid crystal molecules Lm1. In one example, the polymer Lp1 is a liquid crystal polymer. The polymer is obtained by, for example, polymerizing a liquid crystal monomer in a state of being aligned in a predetermined direction by an alignment regulating force of alignment films which are not shown in the drawing. The liquid crystal molecules Lm1 are dispersed in the gaps of the polymer Lp1, and are aligned such that the major axes thereof extend along the alignment regulating force of the alignment films which are not shown in the drawing. In the enlarged part in the drawing, the polymer Lp1 is shown with downward-sloping diagonal lines, and the liquid crystal molecules Lm1 are shown with upward-sloping diagonal lines.

The polymer Lp1 and the liquid crystal molecule Lm1 each have optical anisotropy and refractive anisotropy. When the optical axis of the polymer Lp1 and the optical axis of the liquid crystal molecule Lm1 are parallel to each other, the ordinary refractive index of the polymer Lp1 and the ordinary refractive index of the liquid crystal molecule Lm1 are substantially equal to each other, and the extraordinary refractive index of the polymer Lp1 and the extraordinary refractive index of the liquid crystal molecule Lm1 are substantially equal to each other. Therefore, there is almost no refractive index difference between the polymer Lp1 and the liquid crystal molecule Lm1. Light entering the liquid crystal layer LC1 is transmitted almost without being scattered in the liquid crystal layer LC1. This state is referred to as a transparent state. On the other hand, when the optical axis of the polymer Lp1 and the optical axis of the liquid crystal molecule Lm1 are not parallel to each other, there is a refractive index difference between the polymer Lp1 and the liquid crystal molecule Lm1. Accordingly, light entering the liquid crystal layer LC1 is scattered in the liquid crystal layer LC1. This state is referred to as a scattering state.

The responsiveness to an electric field of the polymer Lp1 is lower than the responsiveness to an electric field of the liquid crystal molecule Lm1. In one example, the alignment direction of the polymer Lp1 hardly changes with or without an electric field. On the other hand, the alignment direction of the liquid crystal molecule Lm1 changes according to an electric field in a state where a high voltage of greater than or equal to a threshold value is applied to the liquid crystal layer LC1. Therefore, the transparent state and scattering state of the liquid crystal layer LC1 can be controlled by controlling the voltage applied to the liquid crystal layer LC1.

The third transparent substrate 30 overlaps the display panel 1 in the third direction Z. That is, the first transparent substrate 10, the second transparent substrate 20 and the third transparent substrate 30 are arranged in this order in the third direction Z. The third transparent substrate 30 has a main surface 30A facing the second transparent substrate 20, and a main surface 30B on the opposite side to the main surface 30A. In one example, the main surfaces 30A and 30B are parallel to the X-Y plane. The end portion E30 of the third transparent substrate 30 is located directly above the end portion E20 of the second transparent substrate 20.

The modulation element 4 is located between the optical element 3 and the end portion E30. The modulation element 4 comprises a fourth transparent substrate 40, a fifth transparent substrate 50, a liquid crystal layer LC2, a sealant SE2 and a control electrode EL. The fourth transparent substrate 40 and the fifth transparent substrate 50 face each other along the second direction Y, and are bonded together by the sealant SE2. In the illustrated example, the fourth transparent substrate 40 is disposed between the optical element 3 and the end portion E30, and the fifth transparent substrate 50 is disposed between the fourth transparent substrate 40 and the end portion E30. The liquid crystal layer LC2 is held inside a region surrounded by the sealant SE2 between the fourth transparent substrate 40 and the fifth transparent substrate 50. In one example, the control electrode EL is disposed on the fourth transparent substrate 40. The control electrode EL applies voltage to the liquid crystal layer LC2. The alignment of liquid crystal molecules contained in the liquid crystal layer LC2 is controlled by the voltage applied to the liquid crystal layer LC2, and a refractive index distribution corresponding to the alignment state of liquid crystal molecules occurs in the liquid crystal layer LC2. By this refractive index distribution, the liquid crystal layer LC2 functions as a lens for light entering the modulation element 4. The details of the modulation element 4 will be described later.

The light-emitting element 2, the optical element 3 and the modulation element 4 are arranged in this order in the second direction Y, and are located directly above the extension portion Ex1. In one example, the light-emitting element 2 is a top-emitting light-emitting diode (LED), and is mounted on the wiring board F1. The wiring board F1 is connected to the fourth transparent substrate 40. In the illustrated example, the wiring board F1 is bent about 90 degrees at three places, and is located below the optical element 3 and above the drivers IC1 to IC4.

In the present embodiment, the light-emitting element 2, the optical element 3, the modulation element 4 and the third transparent substrate 30 can be regarded as an illumination device IL which illuminates the display panel 1. That is, the display device DSP comprises the display panel 1 and the illumination device IL opposed to the display panel 1 in the third direction Z. In addition, in the present embodiment, the light-emitting element 2, the optical element 3 and the modulation element 4 are disposed in the end portion E30 of the third transparent substrate 30. However, they are not limited to this but may be disposed in the end portion of another transparent substrate. For example, when the third transparent substrate 30 is absent but only the first transparent substrate 10 and the second transparent substrate 20 are present, the light-emitting element 2, the optical element 3 and the modulation element 4 may be disposed in the end portion E20 of the second transparent substrate 20. That is, the light-emitting element 2, the optical element 3 and the modulation element 4 may be disposed in the end portion of a transparent substrate opposed to the first transparent substrate 10.

FIG. 3 is a cross-sectional view showing a configuration example of the display panel 1 shown in FIG. 2. The display panel 1 comprises insulating films 11 and 12, a capacitance electrode 13 and alignment films AL1 and AL2 in addition to the first transparent substrate 10, the second transparent substrate 20, the sealant SE1, the liquid crystal layer LC1, the switching element SW, the pixel electrode PE and the common electrode CE.

The first transparent substrate 10 comprises a main surface (outer surface) 10A and a main surface (inner surface) 10B on the opposite side to the main surface 10A. The switching element SW is formed on the main surface 10B side. The insulating film 11 is formed on the main surface 10B, and covers the switching element SW. It should be noted that, although the scanning line G and the signal line S shown in FIG. 1 are disposed between the first transparent substrate 10 and the insulating film 11, the illustrations thereof are omitted here. The capacitance electrode 13 is disposed between the insulating films 11 and 12. The pixel electrode PE is disposed for each pixel PX between the insulating film 12 and the alignment film AL1. That is, the capacitance electrode 13 is disposed between the first transparent substrate 10 and the pixel electrode PE. The pixel electrode PE is electrically connected to the switching element SW via an opening OP of the capacitance electrode 13. The pixel electrode PE overlaps the capacitance electrode 13 across the insulating film 12, and forms the capacitance CS of the pixel PX. The alignment film AL1 covers the pixel electrode PE.

The second transparent substrate 20 comprises a main surface (inner surface) 20A and a main surface (outer surface) 20B on the opposite side to the main surface 20A. The main surface 20A of the second transparent substrate 20 faces the main surface 10B of the first transparent substrate 10. The common electrode CE is disposed on the main surface 20A. The alignment film AL2 covers the common electrode CE. It should be noted that a light-shielding layer may be disposed directly above each of the switching element SW, the scanning line G and the signal line S. In addition, a transparent insulating film may be disposed between the second transparent substrate 20 and the common electrode CE or between the common electrode CE and the alignment film AL2. The common electrode CE is disposed over the pixels PX, and is opposed to the pixel electrodes PE in the third direction Z. In addition, the common electrode CE is electrically connected to the capacitance electrode 13, and has the same potential as the capacitance electrode 13.

The liquid crystal layer LC1 is held between the alignment film AL1 and the alignment film AL2 and is in contact with the two. In other words, the liquid crystal layer LC1 is located between the pixel electrode PE and the common electrode CE. When no voltage is applied between the pixel electrode PE and the common electrode CE, the optical axis of the polymer and the optical axis of the liquid crystal molecule contained in the liquid crystal layer LC1 are parallel to each other, and the liquid crystal layer LC1 is in a transparent state. When voltage is applied between the pixel electrode PE and the common electrode CE, the optical axis of the polymer and the optical axis of the liquid crystal molecule contained in the liquid crystal layer LC1 intersect each other, and the liquid crystal layer LC1 is in a scattering state. The liquid crystal layer LC1 is formed of, for example, a liquid crystal material having a positive dielectric anisotropy.

The first transparent substrate 10 and the second transparent substrate 20 each are, for example, a glass substrate, but each may be an insulating substrate such as a plastic substrate. The insulating film 11 includes, for example, a transparent inorganic insulating film of silicon oxide, silicon nitride, silicon oxynitride or the like, and a transparent organic insulating film of acrylic resin or the like. The insulating film 12 is a transparent inorganic insulating film of silicon nitride or the like. The capacitance electrode 13, the pixel electrode PE and the common electrode CE each are a transparent electrode formed of a transparent conductive material such as indium tin oxide (ITO) or indium zinc oxide (IZO). The alignment films AL1 and AL2 each are a horizontal alignment film having an alignment regulating force substantially parallel to the X-Y plane. In one example, the alignment films AL1 and AL2 are subjected to alignment treatment along the first direction X. The alignment treatment may be rubbing treatment or may be photo-alignment treatment.

FIG. 4 is a cross-sectional view for explaining the operation of the display panel 1. The pixel electrodes PE (PE1, PE2) and the common electrode CE face each other across the liquid crystal layer LC1. It is assumed that no voltage is applied between the pixel electrode PE1 and the common electrode CE and voltage is applied between the pixel electrode PE2 and the common electrode CE.

Light L1 radiated from the light-emitting element 2 to the third transparent substrate 30 via the optical element 3 and the modulation element 4 enters the display panel 1 from the second transparent substrate 20 side, and propagates through the second transparent substrate 20, the liquid crystal layer LC1, the first transparent substrate 10 and the like. The liquid crystal layer LC1 overlapping the pixel electrode PE1 is in the transparent state. Therefore, the light L1 is hardly scattered in a region of the liquid crystal layer LC1 which overlaps the pixel electrode PE1. On the other hand, the liquid crystal layer LC1 overlapping the pixel electrode PE2 is in the scattering state. Therefore, the light L1 is scattered in a region of the liquid crystal layer LC1 which overlaps the pixel electrode PE2. Scattered light L11 which is a part of the light L1 is transmitted through the main surface 20B of the second transparent substrate 20, scattered light L12 which is a part of the light L1 is transmitted through the main surface 10B of the first transparent substrate 10, and the other scattered light propagates through the display panel 1.

In the region overlapping the pixel electrode PE1, external light L2 entering the display panel 1 is transmitted almost without being scattered in the liquid crystal layer LC1. In the region overlapping the pixel electrode PE2, external light L3 entering from the main surface 10B is scattered in the liquid crystal layer LC1, and then light L31 which is a part of the external light L3 is transmitted through the main surface 20B. In addition, external light L4 entering from the main surface 20B is scattered in the liquid crystal layer LC1, and then light L41 which is a part of the external light L4 is transmitted through the main surface 10B.

Therefore, when the user observes the display panel 1 from the main surface 20B side, the user can visually recognize the color of the light L1 in the region overlapping the pixel electrode PE2. In addition, since the light L31 which is a part of the external light is transmitted through the display panel 1, the user can visually recognize the background on the main surface 10B side through the display panel 1. Similarly, when the user observes the display panel 1 from the main surface 10B side, the user can visually recognize the color of the light L1 in the region overlapping the pixel electrode PE2. In addition, since the light L41 which is a part of the external light is transmitted through the display panel 1, the user can visually recognize the background on the main surface 20B side through the display panel 1. In the region overlapping the pixel electrode PE1, since the liquid crystal layer LC1 is in the transparent state, the color of the light L1 is hardly visually recognized, and the user can visually recognize the background through the display panel 1.

Figure 5:
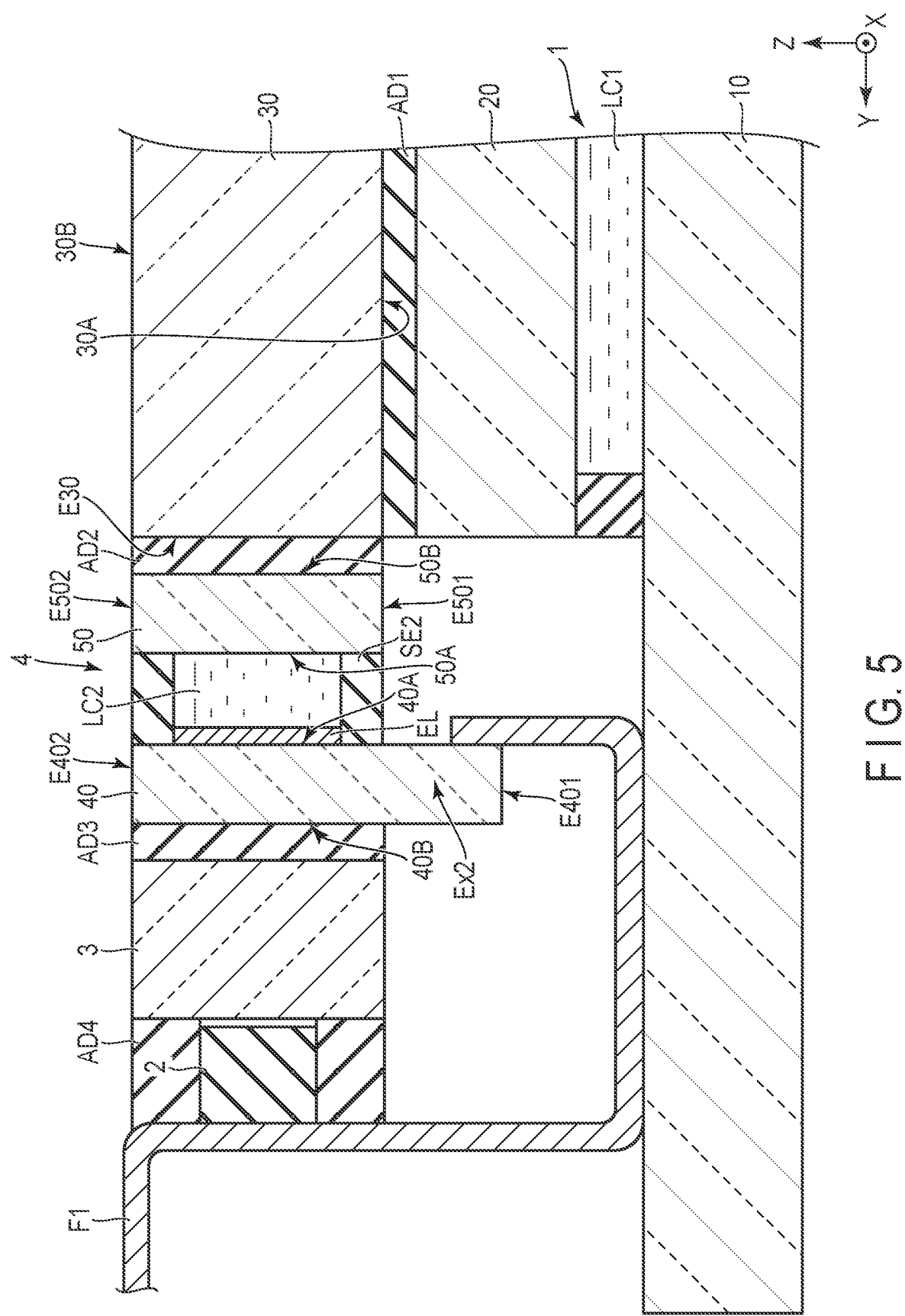
FIG. 5 is a cross-sectional view of the display device DSP in which the vicinity of a modulation element 4 shown in FIG. 2 is shown enlarged.

FIG. 5 is a cross-sectional view of the display device DSP in which the vicinity of the modulation element 4 shown in FIG. 2 is shown enlarged. The fourth transparent substrate 40 has a main surface 40A facing the fifth transparent substrate 50, and a main surface 40B facing the optical element 3. In addition, the fourth transparent substrate 40 has an end portion E401 on the extension portion Ex1 side, and an end portion E402 on the opposite side to the end portion E401. The fifth transparent substrate 50 has a main surface 50A facing the fourth transparent substrate 40, and a main surface 50B facing the end portion E30. Furthermore, the fifth transparent substrate 50 has an end portion E501 on the extension portion Ex1 side, and an end portion E502 on the opposite side to the end portion E501. In one example, the main surfaces 40A, 40B, 50A and 50B are parallel to an X-Z plane.

In the present embodiment, the main surface 50B is opposed to the end portion E30 bus is not opposed to the end portion E20. In the illustrated example, the position of the end portion E502 in the third direction Z matches the position of the main surface 30B of the third transparent substrate 30, and the position of the end portion E501 in the third direction Z matches the position of the main surface 30A of the third transparent substrate 30. In addition, the position of the end portion E402 in the third direction Z matches the position of the end portion E502. On the other hand, the end portion E401 is closer to the extension portion Ex1 than the end portion E501. In other words, the fourth transparent substrate 40 has an extension portion (second extension portion) Ex2 extending more toward the extension portion Ex1 than the end portion E501.

The wiring board F1 is connected to the extension portion Ex2, and is electrically connected to the control electrode EL. That is, the wiring board F1 has a conductive layer on a surface facing the fourth transparent substrate 40. In addition, the fourth transparent substrate 40 has a terminal electrically connected to the control electrode EL on the same side as a surface on which the control electrode EL is disposed. The conductive layer of the wiring board F1 is connected to the terminal of the fourth transparent substrate 40, and the control electrode EL and the wiring board F1 are thereby electrically connected.

In the illustrated example, the display device DSP comprises adhesives AD1, AD2, AD3 and AD4. The adhesive AD1 bonds the main surface 30A of the third transparent substrate 30 and the main surface 20B of the second transparent substrate 20 together. The adhesive AD2 bonds the main surface 50B of the fifth transparent substrate 50 and the end portion E30 of the third transparent substrate 30 together. The adhesive AD3 bonds the optical element 3 and the main surface 40B of the fourth transparent substrate 40 together. The adhesive AD4 bonds the wiring board F1 and the optical element 3 together in a state where the light-emitting element 2 and the optical element 3 face each other. In the illustrated example, the adhesive AD4 is in contact with a surface of the wiring board F1 on which the light-emitting element 2 is mounted, and is not interposed between the light-emitting element 2 and the optical element 3. The adhesives AD1 to AD3 are transparent in one example, and each should preferably have an equal refractive index to the refractive index of a member contacting therewith.

Figure 6A:
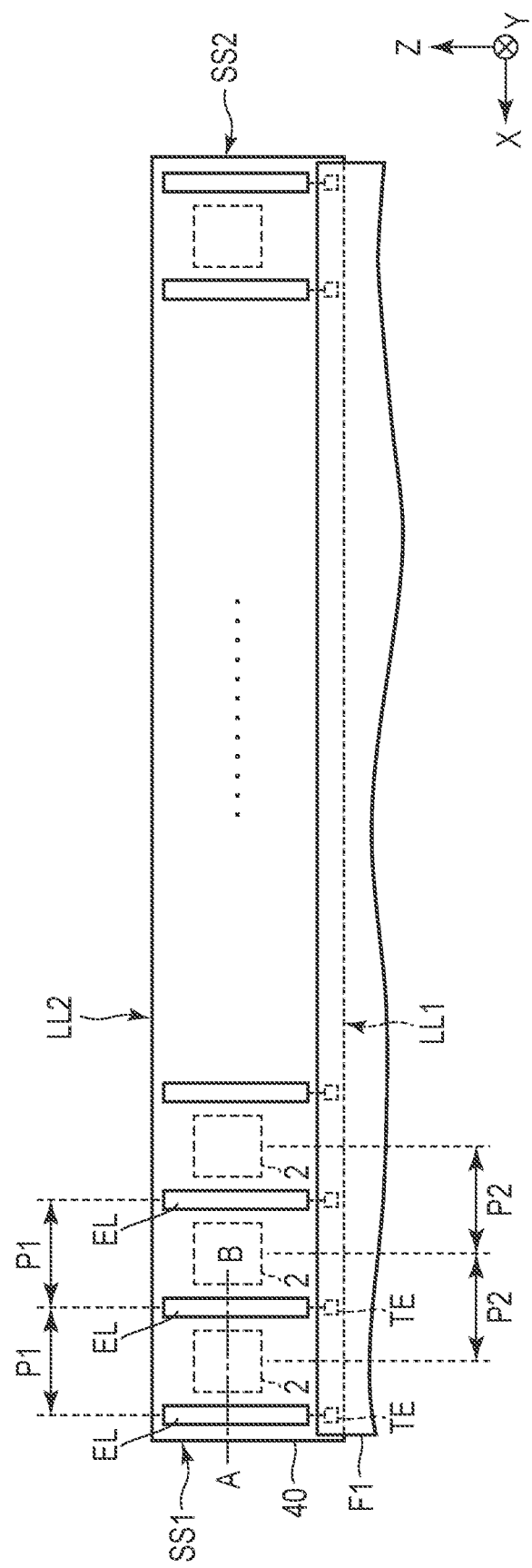
FIG. 6A is a plan view showing a configuration example of a fourth transparent substrate 40 shown in FIG. 5.

FIGS. 6A and 6B each are a plan view showing a configuration example of the fourth transparent substrate 40 shown in FIG. 5. FIGS. 6A and 6B each show a plane parallel to the X-Z plane. The fourth transparent substrate 40 has a substantially rectangular shape having long sides LL1 and LL2 parallel to the first direction X and short sides SS1 and SS2 parallel to the third direction Z. In one example, each control electrode EL is formed in a strip shape. That is, the control electrodes EL extend along the short side SS1, and are arranged at equal intervals with a first pitch P1 along the long side LL1. Here, the first pitch P1 corresponds to the distance between the centers of the control electrodes EL in the first direction X. In addition, the fourth transparent substrate 40 comprises a terminal TE electrically connected to each control electrode EL. In the illustrated example, the terminal TE is located between the control electrode EL and the long side LL1. The wiring board F1 overlaps the terminals TE, and is electrically connected to the terminals TE.

In FIGS. 6A and 6B, the light-emitting elements 2 opposed to the fourth transparent substrate 40 are shown with dotted lines. The light-emitting elements 2 are arranged at equal intervals with a second pitch P2 along the first direction X. Here, the second pitch P2 corresponds to the distance between the centers of the light-emitting elements 2 in the first direction X. In the present embodiment, the second pitch P2 is greater than or equal to the first pitch P1. Furthermore, the second pitch P2 should preferably be an integer multiple of the first pitch P1.

The example shown in FIG. 6A corresponds to a case where the second pitch P2 is equal to the first pitch P1. As shown in FIG. 6A, when the second pitch P2 is an odd multiple of the first pitch P1, the light-emitting element 2 is opposed to substantially the center between the adjacent control electrodes EL in the first direction X.

The example shown in FIG. 6B corresponds to a case where the second pitch P2 is twice the first pitch P1. As shown in FIG. 6B, when the second pitch P2 is an even multiple of the first pitch P1, the position of the center of the light-emitting element 2 and the position of the center of the control electrode EL opposed to the light-emitting element 2 match. According to the above-described configuration, in either of the cases of FIGS. 6A and 6B, one lens LNS can be formed for one light-emitting element 2.

FIG. 7 is a cross-sectional view of the modulation element 4 along line A-B shown in FIG. 6A. FIG. 7 shows a plane parallel to the X-Y plane. The modulation element 4 has an alignment film 41 and an alignment film 51 in addition to the fourth transparent substrate 40, the fifth transparent substrate 50, the sealant SE1, the liquid crystal layer LC2 and the control electrodes EL (EL1, EL2).

The fourth transparent substrate 40 and the fifth transparent substrate 50 are transparent and are formed of, for example, glass or resin. The control electrodes EL are arranged along the first direction X on the main surface 40A. The control electrodes EL are formed of a transparent conductive material such as indium tin oxide (ITO) or indium zinc oxide (IZO).

The alignment film 41 covers the control electrodes EL. The alignment film 51 covers the main surface 50A. The liquid crystal layer LC2 is held between the alignment film 41 and the alignment film 51, and is in contact with the two. In one example, the liquid crystal layer LC2 is initially aligned in a direction perpendicular to the main surfaces 40A and 50A, that is, in a direction parallel to the second direction Y. The liquid crystal layer LC2 is formed of, for example, a liquid crystal material having a positive dielectric anisotropy. That is, the liquid crystal molecules Lm2 contained in the liquid crystal layer LC2 are aligned such that the major axes thereof extend along an electric field in a state where an electric field is formed.

A case where voltages having different polarities are supplied to control electrodes EL1 and EL2 which are adjacent to each other will be described below. It is assumed that a voltage of 6 V is supplied to the control electrode EL1 and a voltage of −6 V is supplied to the control electrode EL2, for example. Between the control electrode EL1 and the control electrode EL2, mostly, an electric field along the first direction X is formed, and the liquid crystal molecules Lm2 contained in the liquid crystal layer LC2 are therefore aligned such that the major axes thereof extend along the first direction X. In the vicinity of the control electrodes EL1 and EL2, an electric field inclined with respect to the third direction Z is formed, and the liquid crystal molecules Lm2 are therefore aligned such that the major axes thereof are inclined with respect to the third direction Z.

The liquid crystal molecules Lm2 have a refractive anisotropy $\Delta n$. Therefore, the liquid crystal layer LC2 has a refractive index distribution corresponding to the alignment state of the liquid crystal molecules Lm2. Alternatively, the liquid crystal layer LC2 has a retardation distribution or a phase distribution represented as $\Delta n \cdot d$ where d is the thickness along the second direction Y of the liquid crystal layer LC2. The lens LNS shown with a dotted line in the drawing is formed by this refractive index distribution, retardation distribution or phase distribution. The illustrated lens LNS functions as a convex lens.

Here, of light traveling in the opposite direction to an arrow indicating the second direction Y in the drawing, linearly polarized light having a vibration plane along the first direction X is referred to as first linearly polarized light POL1, and linearly polarized light having a vibration plane along the third direction Z is referred to as second linearly polarized light POL2. The lens LNS of the present embodiment has different effects on the first linearly polarized light POL1 and the second linearly polarized light POL2. For example, when natural light enters the modulation element 4 from the fourth transparent substrate 40 side, the lens LNS transmits the second linearly polarized light POL2 of the natural light almost without refracting it, and refracts the first linearly polarized light POL1 of the natural light. That is, the lens LNS has a convergence effect mostly on the first linearly polarized light POL1.

Therefore, in one example, the light emitted from the light-emitting element 2 should preferably be the first linearly polarized light POL1. Alternatively, a polarizer having a transmission axis parallel to the first direction X may be disposed or a conversion element which converts the second linearly polarized light POL2 into the first linearly polarized light POL1 may be disposed between the light-emitting element 2 and the modulation element 4.

In the present embodiment, as an example of the modulation element 4 comprising the lens LNS, a method in which the liquid crystal layer LC2 initially aligned substantially perpendicularly to the main surface of a substrate is combined with electric fields along a direction parallel to the main surface of a substrate and a direction intersecting the main surface of a substrate has been described. However, it is not limited to this. For example, a liquid crystal layer initially aligned along the main surface of a substrate may be combined or an electric field perpendicular to the main surface of a substrate may be combined. The modulation element comprising the lens LNS can be realized by any method in which the refractive index distribution is changed according to the electric field applied to the liquid crystal layer. The main surface of the substrate here is the X-Z plane.

Figure 8:
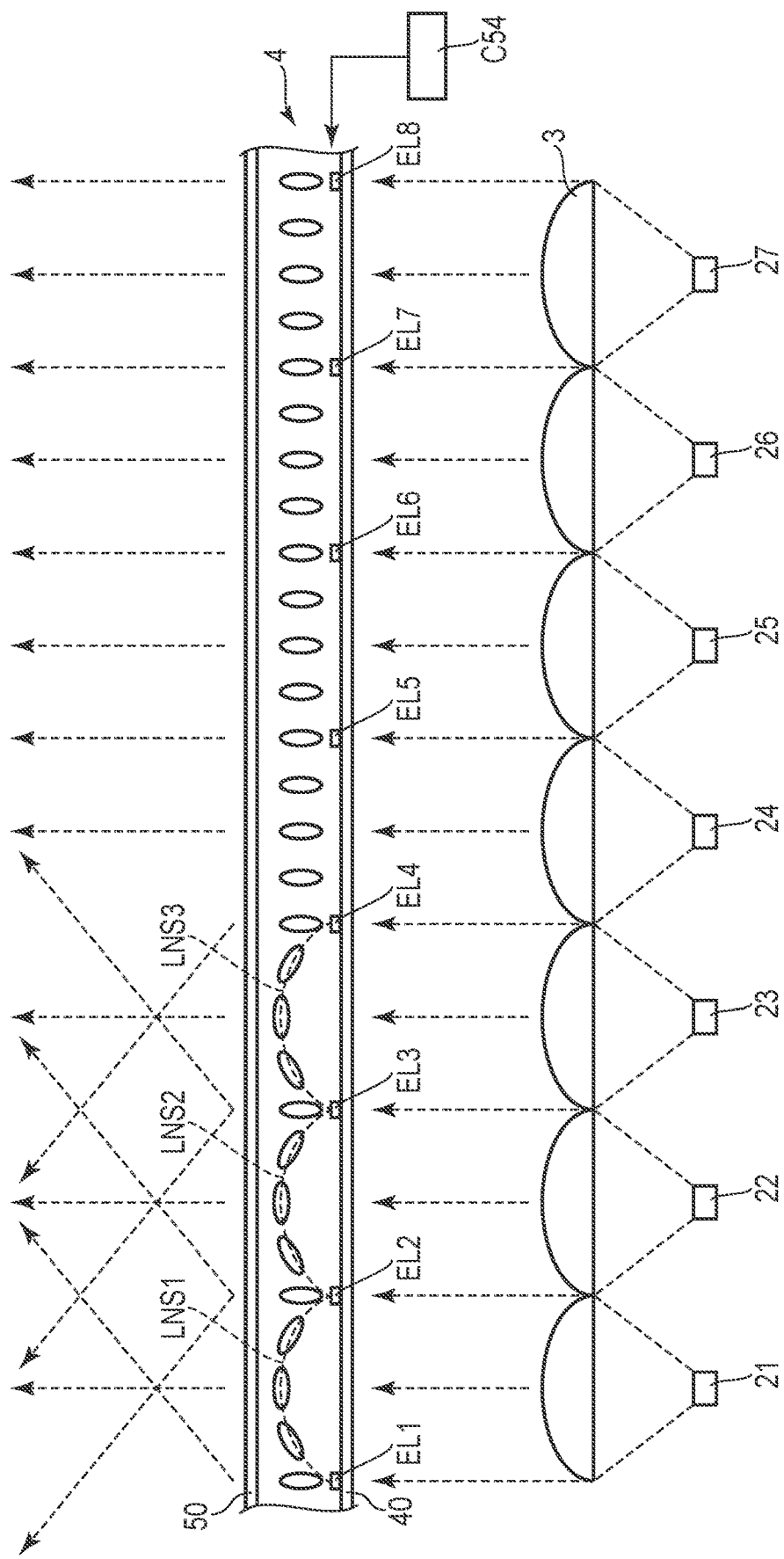
FIG. 8 is an illustration for explaining the operation of the modulation element 4.

FIG. 8 is an illustration for explaining the operation of the modulation element 4. FIG. 8 shows eight control electrodes EL (EL1 to EL8) and seven light-emitting elements 2 (21 to 27). The light-emitting elements 2 are regarded as point sources. The example shown in FIG. 8 corresponds to a case where the first pitch P1 of the control electrode EL is equal to the second pitch P2 of the light-emitting element 2.

The modulation element 4 is controlled by the modulation controller C54. More specifically, the modulation controller C54 can switch between the first mode in which the lens LNS is formed in the liquid crystal layer LC2 and the second mode in which no lens is formed in the liquid crystal layer LC2 by controlling voltage supplied to the control electrode EL. In addition, the modulation controller C54 can control the formation position of the lens LNS by controlling the voltage supplied to each control electrode EL. That is, the modulation controller C54 can switch between the third mode in which the lens LNS is formed at the first position of the liquid crystal layer LC and the fourth mode in which the lens LNS is formed at the second position different from the first position of the liquid crystal layer LC2.

In the illustrated example, lens LNS1 to LNS3 are formed at positions opposed to light-emitting elements 21 to 23 of the liquid crystal layer LC2, respectively. In this case, voltages having different polarities are applied alternately to control electrodes EL1, EL2, EL3 and EL4 which are adjacent to one another. In addition, the same voltage is applied to control electrodes EL4 to EL8. It should be noted that the modulation controller C54 may control the shape and size of the lens LNS formed in the liquid crystal layer LC2 by controlling the voltage supplied to each control electrode EL.

The light emitted from the light-emitting elements 2 is converted into parallel light substantially parallel to the second direction Y by the optical element 3. Of the light entering the modulation element 4 via the optical element 3, light transmitted through a region in which the lens LNS1 to LNS3 are formed is diffused by the lens LNS1 to LNS3. On the other hand, light transmitted through a region in which no lens is formed, that is, a region between the control electrode EL4 and the control electrode EL8 is transmitted through the modulation element 4 almost without being diffused, that is, while it remains as substantially parallel light.

Figure 9A:
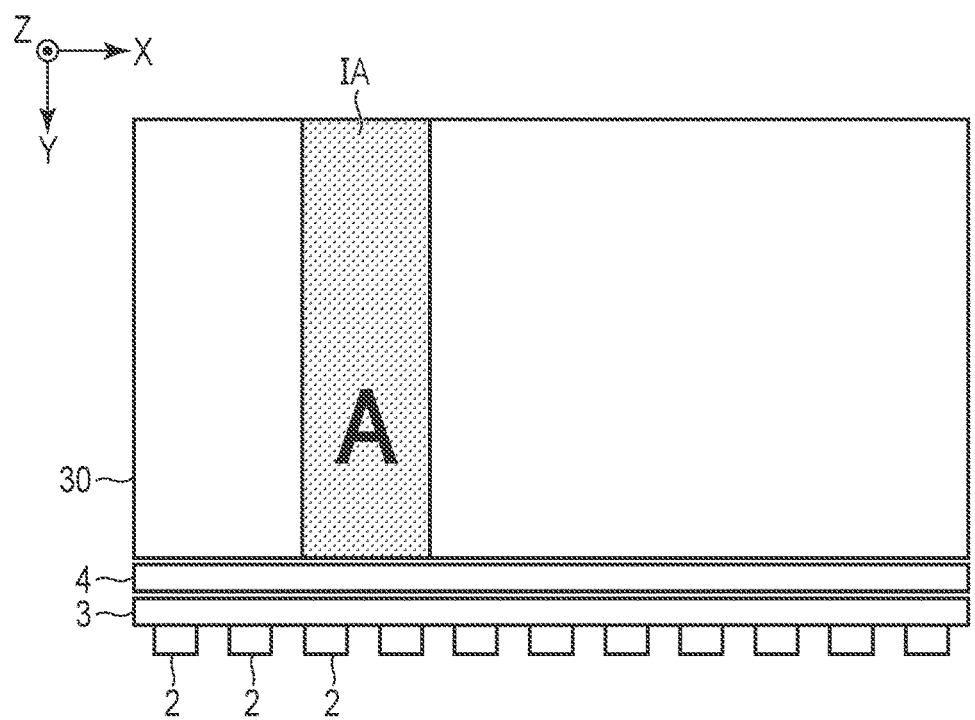
FIG. 9A is an illustration for explaining the effects of the present embodiment.
Figure 9B:
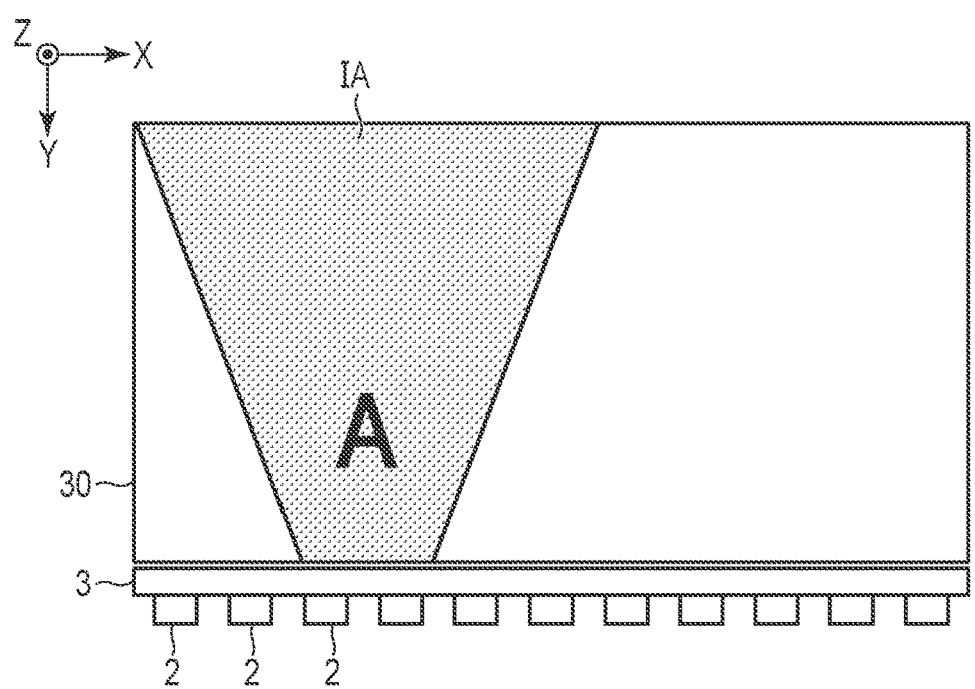
FIG. 9B is an illustration for explaining a comparative example.

FIG. 9A is an illustration for explaining the effects of the present embodiment, and FIG. 9B is an illustration of a comparative example. According to the present embodiment, the display device DSP comprises the modulation element 4 located between the light-emitting element 2 and the third transparent substrate 30. By controlling the voltage applied to the control electrode EL in the modulation element 4, the lens LNS can be formed at an arbitrary position in the liquid crystal layer LC2. In other words, the lens LNS facing each light-emitting element 2 can be formed. Therefore, the spreading of light entering the third transparent substrate 30 from the light-emitting element 2 via the optical element 3 and the modulation element 4 can be controlled according to the display state of the display panel 1.

For example, as shown in FIG. 9A, when an image is displayed on a part of the display panel 1, light-emitting elements 2a and 2b corresponding to the image are turned on. According to the present embodiment, the lenses LNS are formed partly at positions facing the light-emitting elements 2a and 2b, and parallel light can thereby enter a region corresponding to a region of the third transparent substrate 30 in which the image is displayed. In other words, an irradiation region IA for irradiating the display panel 1 can be set to a minimum necessary area. Therefore, the entry of light to a region in which no image is displayed is suppressed, and the scattering of light by a wiring line and the like is suppressed. As a result, the transparency of the display device DSP can be improved. In the display panel 1, when an image is displayed on the entire surface of the display region DA, the lenses LNS are formed for the respective light-emitting elements 2, and the irradiation region IA can thereby be formed over the entire display panel 1. As a result, the display panel 1 can be evenly irradiated.

On the other hand, as shown in FIG. 9, when the modulation element 4 is not disposed, the position and area of the irradiation region IA cannot be controlled according to the display state of the display panel 1. Therefore, even when only the light-emitting elements 2a and 2b are turned on, light may spread to a region in which no image is displayed, and light may be scattered in a region in which no image is displayed, the transparency of the display panel 1 may be impaired.

As described above, according to the present embodiment, a display device capable of improving display quality can be provided.

Second Embodiment

Figure 10:
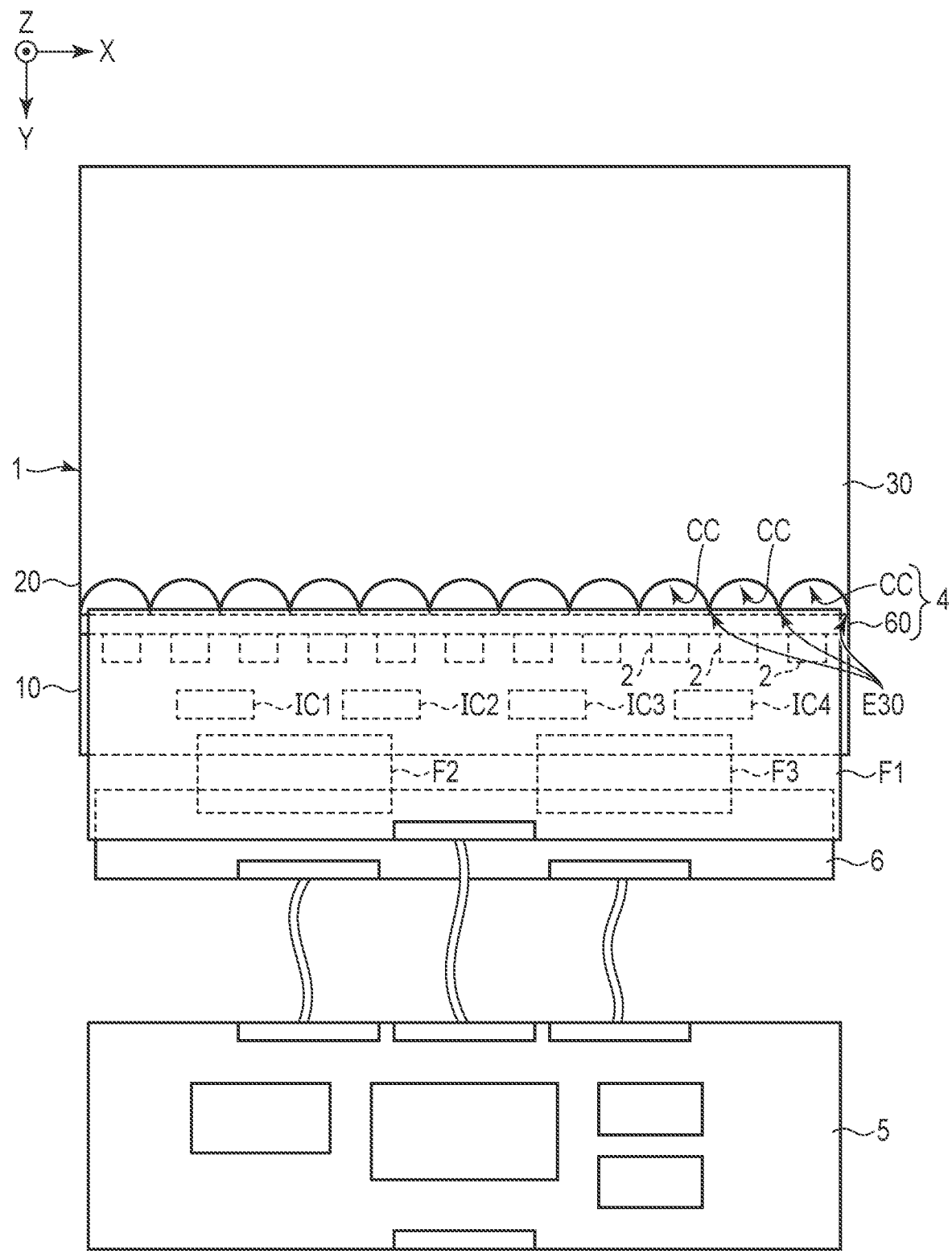
FIG. 10 is a plan view showing an overview of a display device DPS according to the second embodiment.

FIG. 10 is a plan view showing an overview of the display device DPS according to the second embodiment. The second embodiment is different from the first embodiment in that the third transparent substrate 30 has concave portions CC. The concave portions CC are more recessed away from the light-emitting elements 2 than the end portion E30 of the third transparent substrate 30. Here, the end portion E30 is the end portion of the third transparent substrate 30 which is closest to the light-emitting elements 2. The concave portions CC have a semicircular shape in the illustrated example, but may have a curved shape other than an arc shape. The concave portions CC are arranged along the first direction X, and face the light-emitting elements 2, respectively. More specifically, the position of the center of the concave portion CC and the position of the center of the light-emitting element 2 match in the first direction X. In addition, the display device DSP does not have the optical element 3 but has a sealing board 60 facing the concave portions CC. In the present embodiment, the concave portions CC and the sealing board 60 function as the modulation element 4.

Figure 11A:
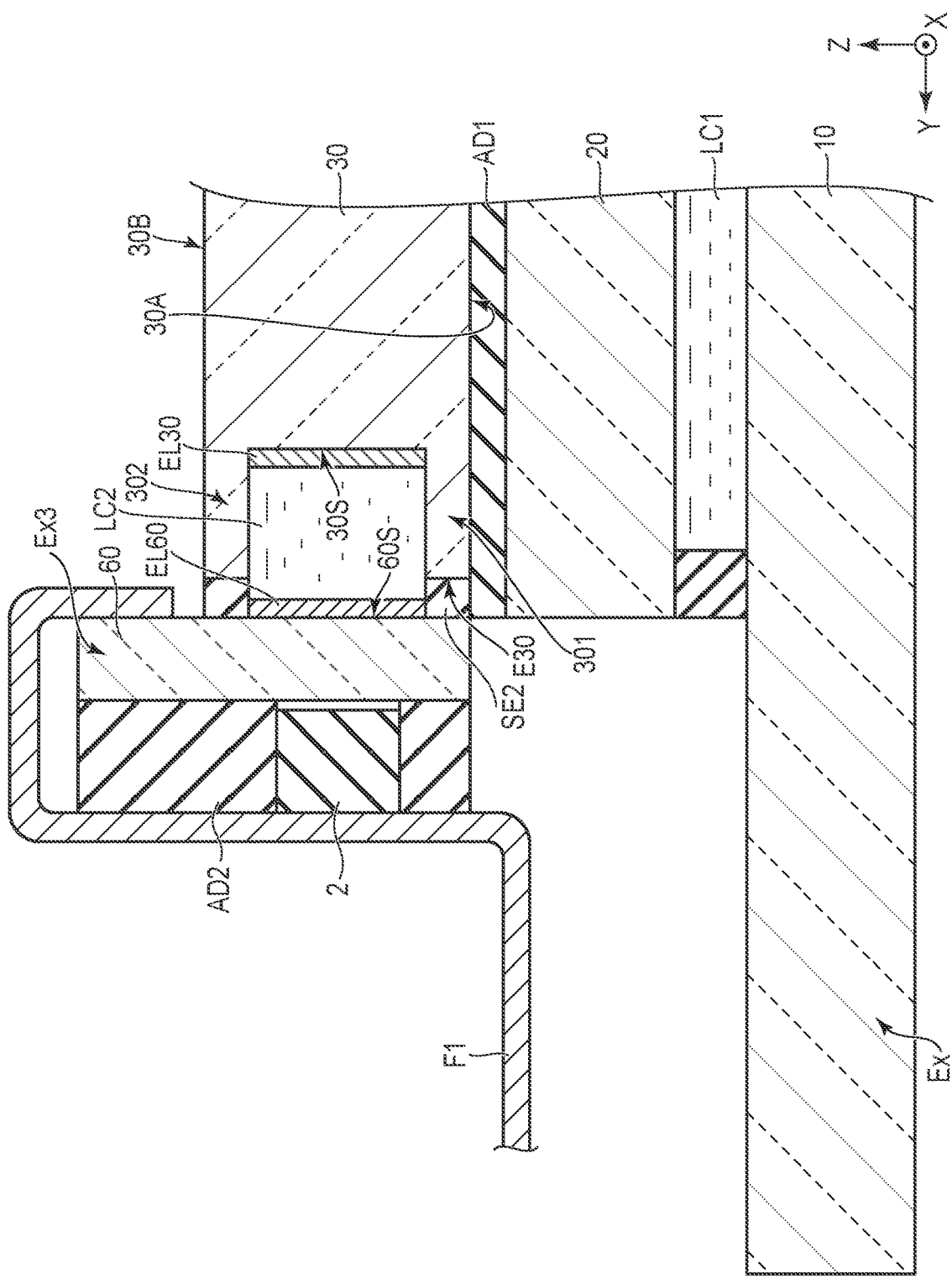
FIG. 11A is a cross-sectional view of the display device DSP in which the vicinity of a concave portion CC shown in FIG. 10 is shown enlarged.

FIG. 11A is a cross-sectional view of the display device DSP in which the vicinity of the concave portion CC shown in FIG. 10 is shown enlarged. The display device DSP comprises the liquid crystal layer LC2, the sealant SE2, a control electrode EL30 and a control electrode EL60 in addition to the display panel 1, the light-emitting element 2, the third transparent substrate 30, the sealing board 60 and the wiring board F1.

The concave portion CC is formed between the main surface 30A and the main surface 30B. In other words, the third transparent substrate 30 has a lower plate portion 301 including the main surface 30A, an upper plate portion 302 including the main surface 30B, and a surface 30S connecting the lower plate portion 301 and the upper plate portion 302. In the illustrated example, the surface 30S is farther from the light-emitting element 2 than the end portion E30.

The sealing board 60 faces the end portion E30 of the third transparent substrate 30 along the second direction Y, and is bonded thereto by the sealant SE2. The sealing board 60 is transparent, and is formed of, for example, glass or resin. The liquid crystal layer LC2 is held inside a region surrounded by the sealing board 60, the lower plate portion 301, the upper plate portion 302 and the surface 30S. That is, the concave portion CC is filled with the liquid crystal layer LC2.

The control electrode EL30 is formed on the surface 30S. The control electrode EL60 is formed on a surface 60S of the sealing board 60 which faces the third transparent substrate 30. The control electrodes EL30 and EL60 apply voltage to the liquid crystal layer LC2. The alignment of liquid crystal molecules contained in the liquid crystal layer LC2 is controlled by the voltage applied between the control electrode EL30 and the control electrode EL60, and a refractive index distribution corresponding to the alignment state of liquid crystal molecules occurs in the liquid crystal layer LC2. The control electrodes EL30 and EL60 are formed of a transparent conductive material such as ITO or IZO.

In the illustrated example, the sealing board 60 has an extension portion Ex3 extending more upward than the main surface 30B. The wiring board F1 is connected to the extension portion Ex3, and extends through above the sealing board 60. The wiring board F1 electrically connects the control electrode EL30 and the control electrode EL60. That is, the wiring board F1 has a conductive layer on a surface facing the sealing board 60. In addition, the sealing board 60 has a terminal electrically connected to the control electrode EL60 on the same side as a surface on which the control electrode EL60 is disposed. The third transparent substrate 30 has a wiring line electrically connected to the control electrode EL30. This wiring line is drawn to a side surface of the third transparent substrate 30, and is electrically connected to the terminal of the sealing board 60 via a conductive member, for example. The conductive layer of the wiring board F1 is connected to the terminal of the sealing board 60, and the control electrode EL30, the control electrode EL60 and the wiring board F1 are thereby electrically connected.

The light-emitting element 2 is mounted on the wiring board F1, and faces the sealing board 60. In the illustrated example, no other member is interposed between the light-emitting element 2 and the sealing board 60, but the wiring board F1 and the sealing board 60 are bonded together by the transparent adhesive AD2.

Figure 11B:
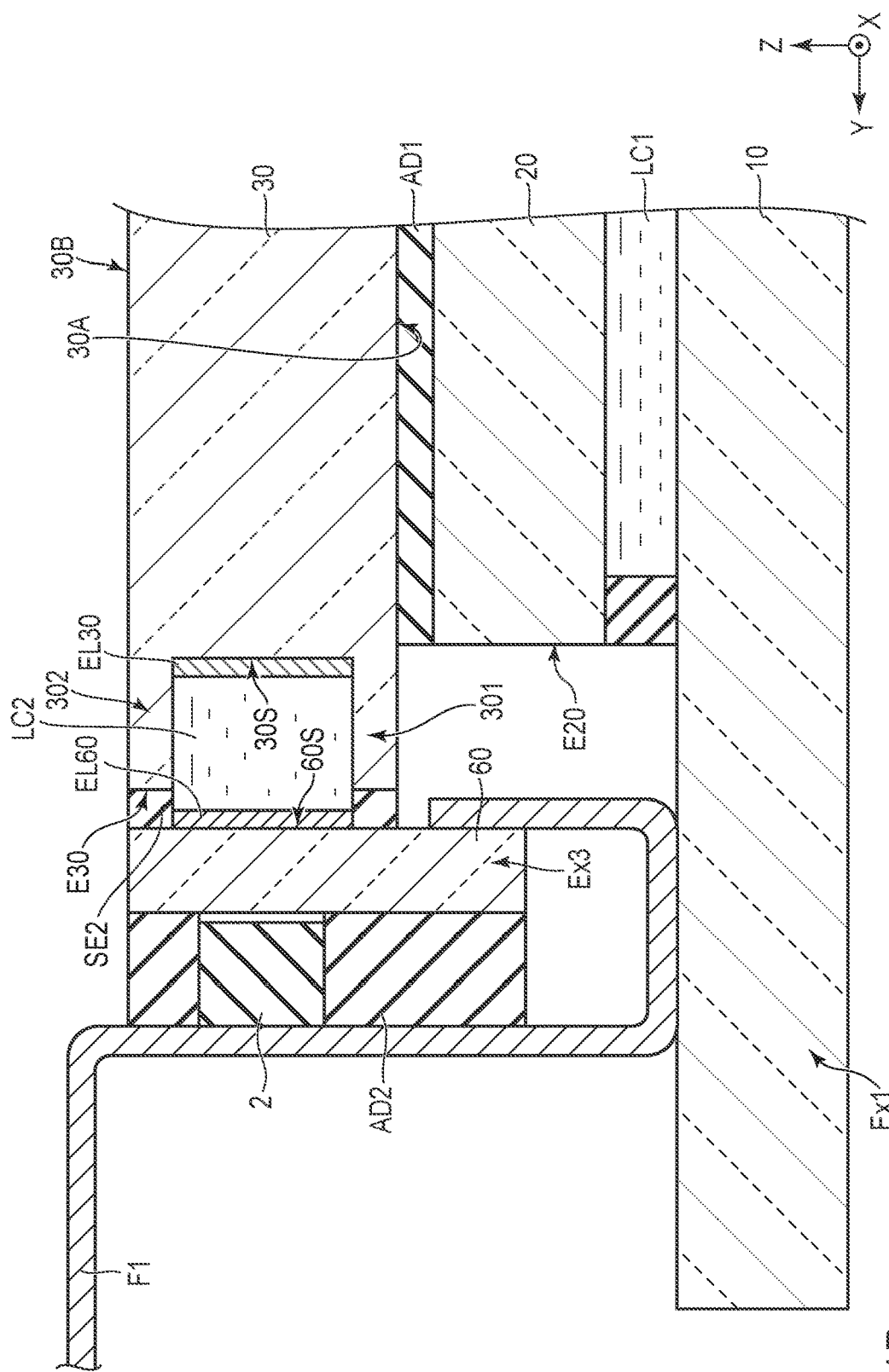
FIG. 11B is a cross-sectional view of the display device DSP showing another example of an extension portion Ex3.

It should be noted that, as shown in FIG. 11B, the extension portion Ex3 may extend more downward than the main surface 30A. The wiring board F1 is connected to the extension portion Ex3, and extends through below the sealing board 60, that is, between the sealing board 60 and the first transparent substrate 10. In the illustrated example, the wiring board F1 is in contact with the extension portion Ex1 of the first transparent substrate 10. An adhesive may be interposed between the wiring board F1 and the extension portion Ex1. Also in the example shown in FIG. 11B, the wiring board F1 has a conductive layer on a surface facing the sealing board 60, and is electrically connected to the terminal of the sealing board 60. In the example shown in FIG. 11B, the second transparent substrate 20 is not disposed below the liquid crystal layer LC2. In other words, the liquid crystal layer LC2 is located more outward than the second transparent substrate 20. That is, the end portion E30 of the third transparent substrate 30 is located more outward than the end portion E20 of the second transparent substrate 20.

FIG. 12A is a plan view showing a configuration example of the modulation element 4. The modulation element 4 comprises alignment films 31 and 61 in addition to the third transparent substrate 30, the sealing board 60, the liquid crystal layer LC2, the control electrode EL30 and the control electrode EL60.

The control electrode EL30 is disposed inside the concave portion CC, and is covered with the alignment film 31. More specifically, the individual control electrodes EL30 are formed for the concave portions CC, respectively. That is, the control electrodes EL30 are not disposed in the end portion E30, but the alignment film 31 is in contact with the end portion E30 in the illustrated example.

The control electrodes EL60 are arranged along the first direction X, and face the concave portions CC, respectively. The control electrodes EL60 are covered with the alignment film 61.

The liquid crystal layer LC2 is held between the alignment film 31 and the alignment film 61, and is in contact with the two. The alignment films 31 and 61 each are, for example, a horizontal alignment film, and are both subjected to alignment treatment along the first direction X. The liquid crystal layer LC2 is formed of, for example, a liquid crystal material having a positive dielectric anisotropy similarly to the first embodiment.

Figure 12B:
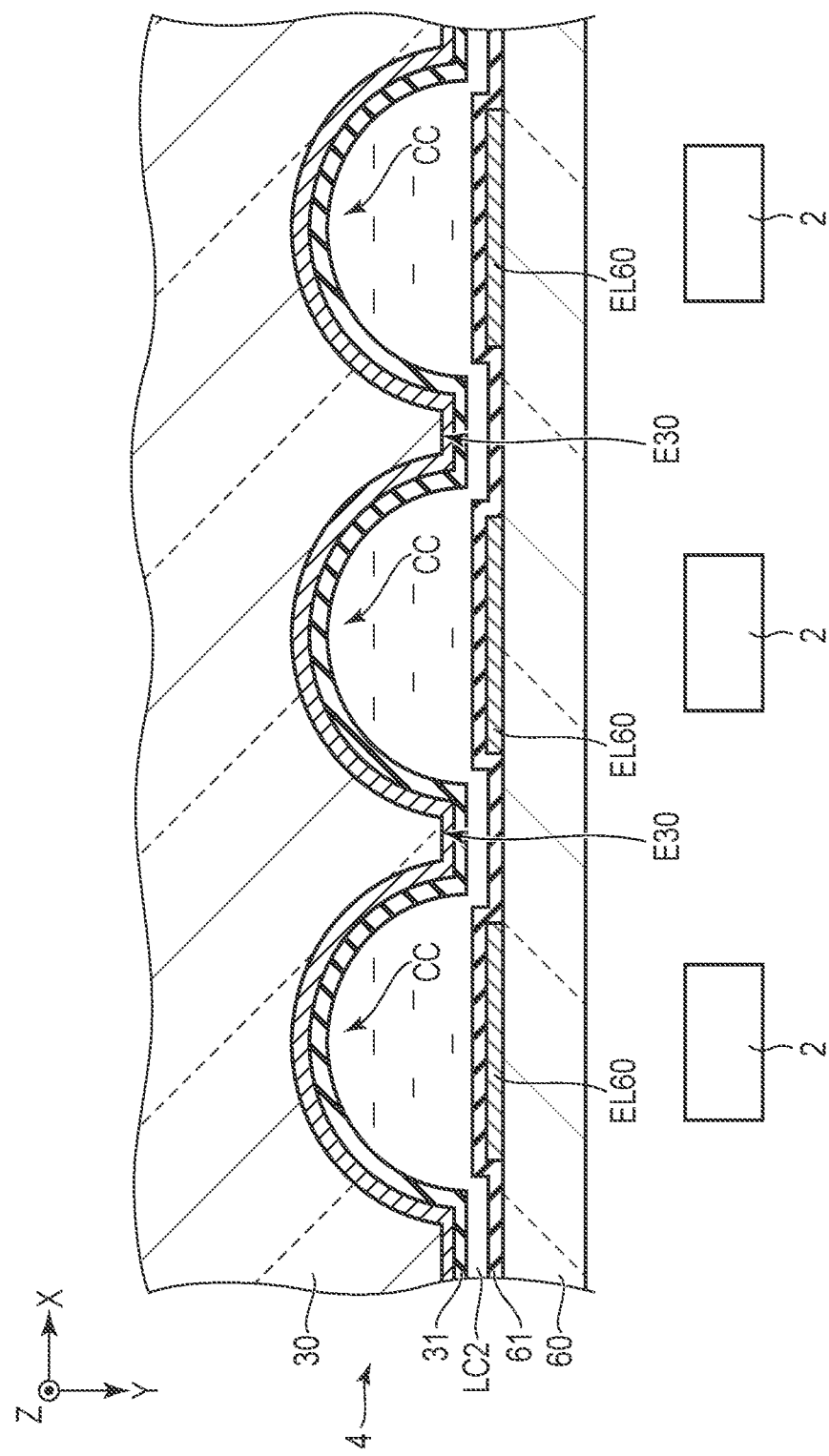
FIG. 12B is a plan view showing another configuration example of the modulation element 4.

FIG. 12B is a plan view showing another configuration example of the modulation element 4. In the example shown in FIG. 12B, the control electrode EL30 is disposed common to the concave portions CC. That is, the control electrode EL30 is disposed inside the concave portions CC, and is also disposed in the end portion E30. It should be noted that the control electrode EL30 only has to be disposed common to two or more concave portions CC and the single control electrode EL30 may not be disposed common to all the concave portions CC.

Figure 13A:
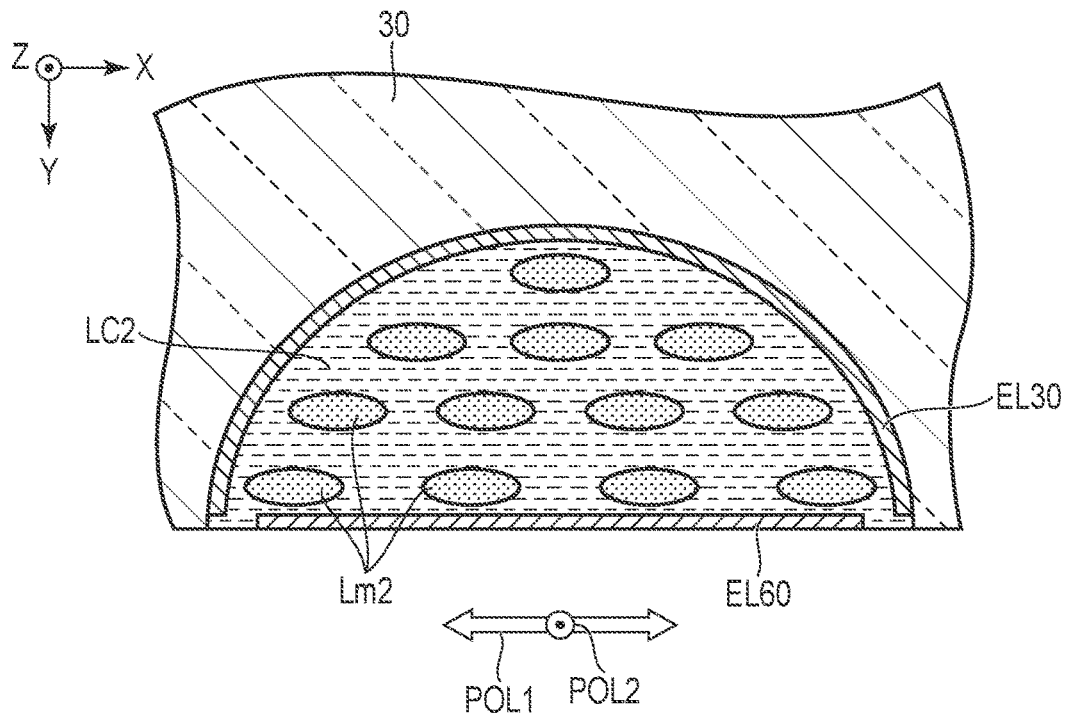
FIG. 13A is an illustration showing the alignment state of liquid crystal molecules Lm2 when no voltage is applied between a control electrode EL30 and a control electrode EL60.
Figure 13B:
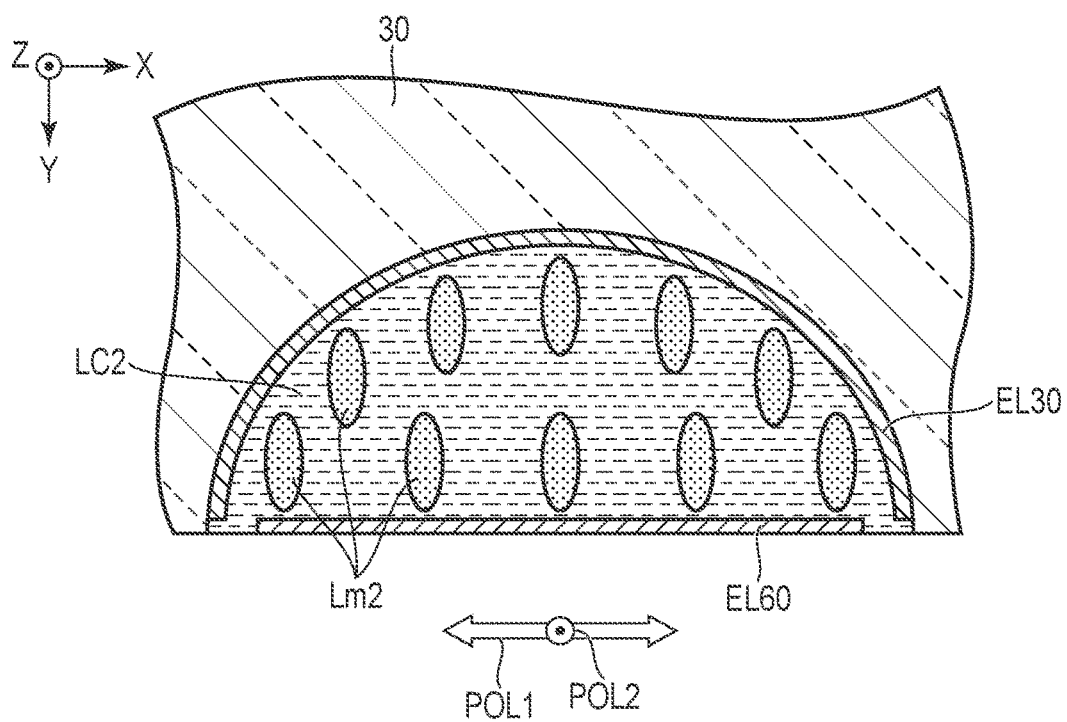
FIG. 13B is an illustration showing the alignment state of the liquid crystal molecules Lm2 when voltage is applied between the control electrode EL30 and the control electrode EL60.

FIGS. 13A and 13B each are an illustration showing the alignment state of the liquid crystal molecules Lm2 contained in the liquid crystal layer LC2. FIG. 13A shows the alignment state of the liquid crystal molecules Lm2 when no voltage is applied between the control electrode EL30 and the control electrode EL60. In the example shown in FIG. 13A, the liquid crystal molecules Lm2 are aligned such that the major axes thereof extend along the first direction X. At this time, the liquid crystal layer LC2 inside the concave portion CC transmits the second linearly polarized light POL2 having a vibration plane along the third direction Z almost without refracting it, and refracts the first linearly polarized light POL1 having a vibration plane along the first direction X. In one example, the concave portion CC functions as a cylindrical lens for the first linearly polarized light POL1 entering from the sealing board 60 side.

FIG. 13B shows the alignment state of the liquid crystal molecules Lm2 when voltage is applied between the control electrode EL30 and the control electrode EL60. While voltage is applied, the liquid crystal molecules Lm2 are aligned such that the major axes thereof extend along an electric field. In the example shown in FIG. 13B, the major axes of the liquid crystal molecules Lm2 are substantially parallel to the second direction Y. At this time, the liquid crystal layer LC2 inside the concave portion CC transmits both the first linearly polarized light POL1 and the second linearly polarized light POL2 almost without refracting them.

Figure 14:
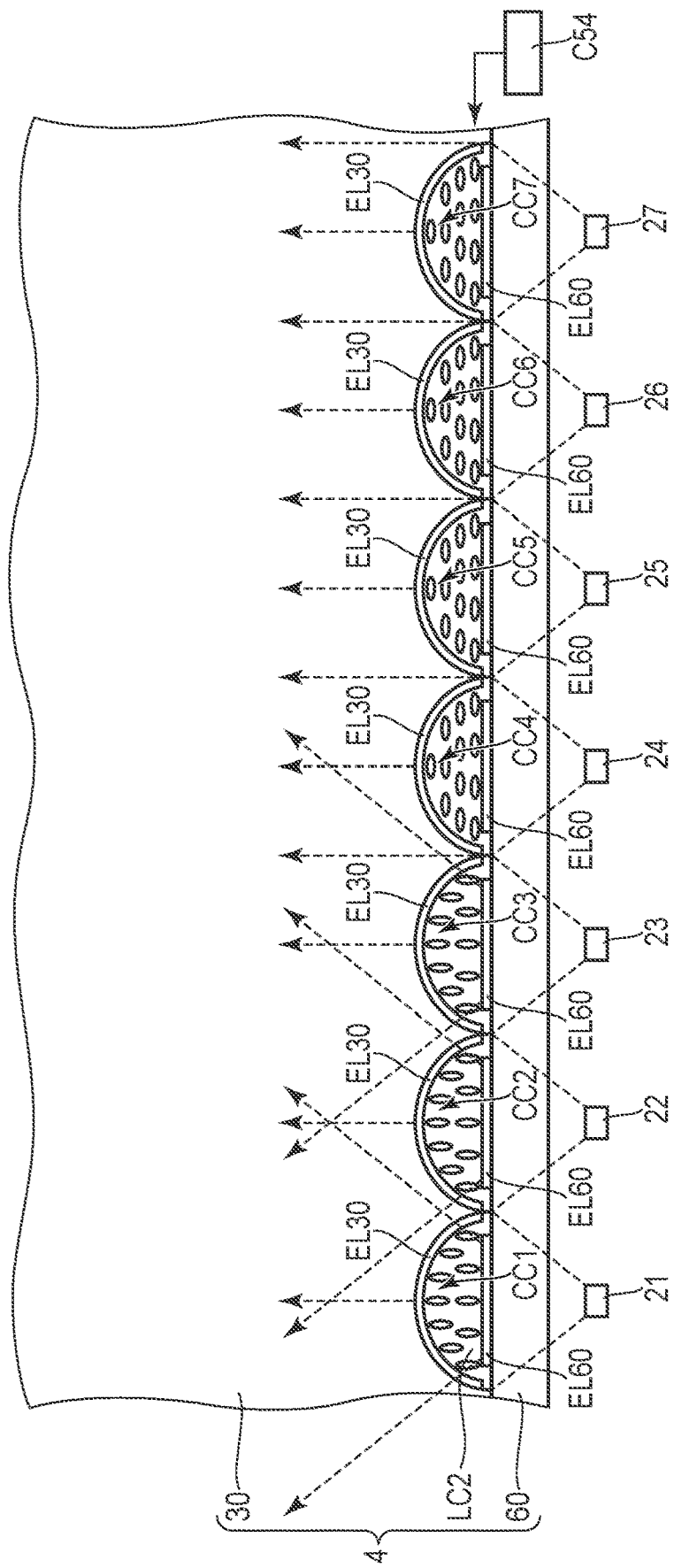
FIG. 14 is an illustration for explaining the operation of the modulation element 4.

FIG. 14 is an illustration for explaining the operation of the modulation element 4. FIG. 14 shows seven light-emitting elements 21 to 27, concave portions CC1 to CC7 facing the respective light-emitting elements 21 to 27, control electrodes EL30 disposed in the respective concave portions CC1 to CC7, and control electrodes EL60 facing the respective concave portions CC1 to CC7. The modulation controller C54 controls voltage supplied to the control electrodes EL30 and the EL60, and thereby controls the alignment direction of the liquid crystal molecules Lm2 contained in the liquid crystal layer LC2.

In the illustrated example, in the concave portions CC1 to CC3, voltage is applied between the control electrode EL30 and the control electrode EL60. The light emitted from the light-emitting elements 21 to 23 is transmitted through the concave portions CC1 to CC3 almost without being refracted by the liquid crystal layer LC2 in the concave portions CC1 to CC3. That is, the light emitted from the light-emitting elements 21 to 23 is transmitted through the concave portions CC1 to CC3 while it remains diffused. On the other hand, in the concave portions CC4 to CC7, no voltage is applied between the control electrode EL30 and the control electrode EL60. In the illustrated example, light emitted from the light-emitting elements 24 to 27 is refracted in the concave portions CC4 to CC7, and is converted into parallel light.

As described above, also in the second embodiment, the spreading of light entering the third transparent substrate 30 can be controlled for each light-emitting element 2 according to the display state of the display panel 1, and therefore the same effects as those obtained in the first embodiment can be obtained. In addition, the concave portion CC functions as a cylindrical lens, and therefore as compared with when the thickness of the liquid crystal layer LC2 is uniform, a large refractive index difference can be created between the liquid crystal layer LC2 and the third transparent substrate 30. Consequently, the optical path of incident light can be converted greatly without any other optical element.

Third Embodiment

Figure 15:
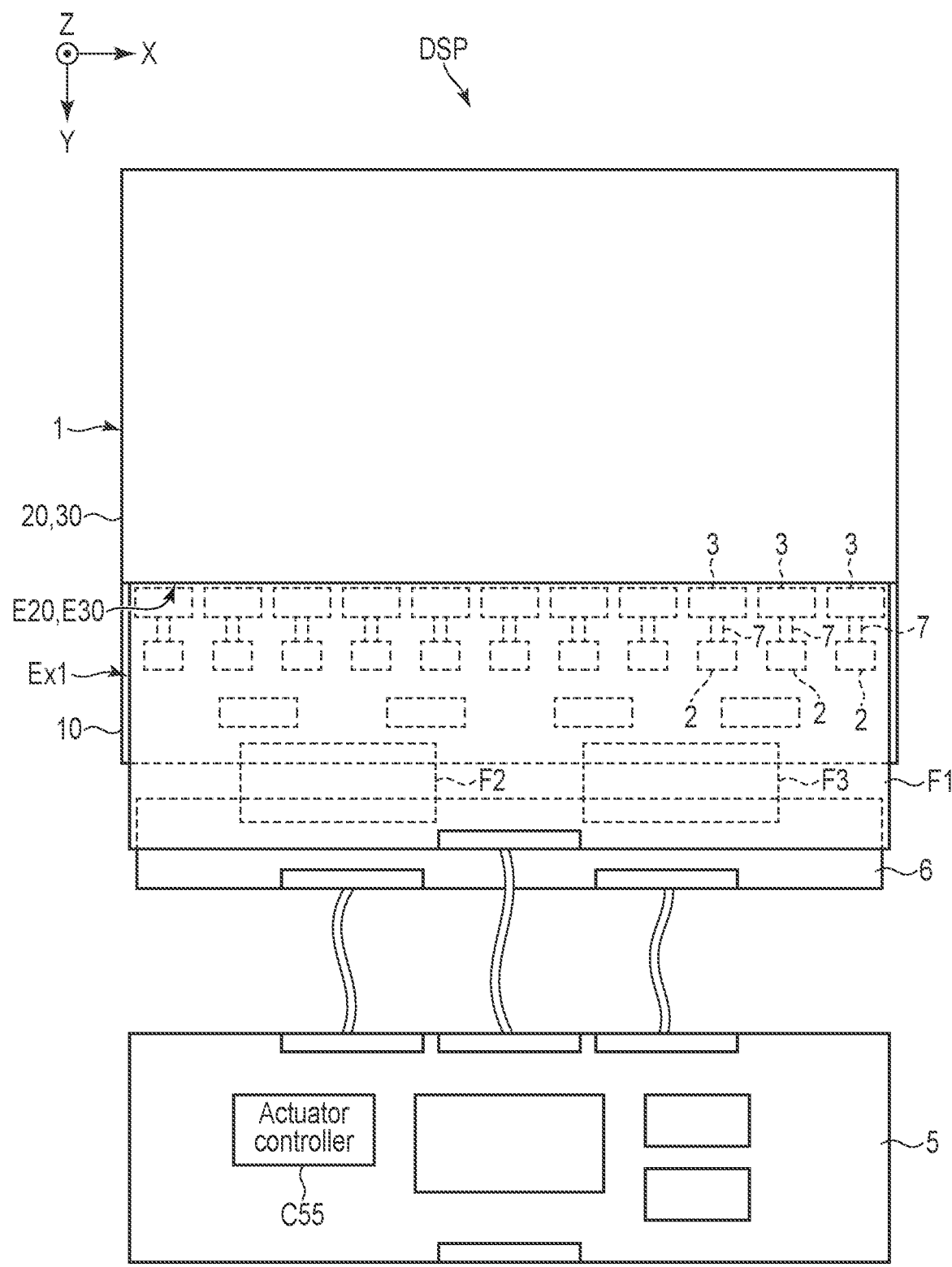
FIG. 15 is a plan view showing an overview of a display device DSP according to the third embodiment.

FIG. 15 is a plan view showing an overview of the display device DSP according to the third embodiment. The third embodiment is different from the first embodiment in that the display device DSP comprises the optical elements 3 facing the respective light-emitting elements 2 and an actuator 7 located between the light-emitting elements 2 and the optical elements 3. In addition, the display device DSP comprises an actuator controller C55 which controls the actuator 7. In one example, the actuator controller C55 is mounted on the control board 5.

Figure 16:
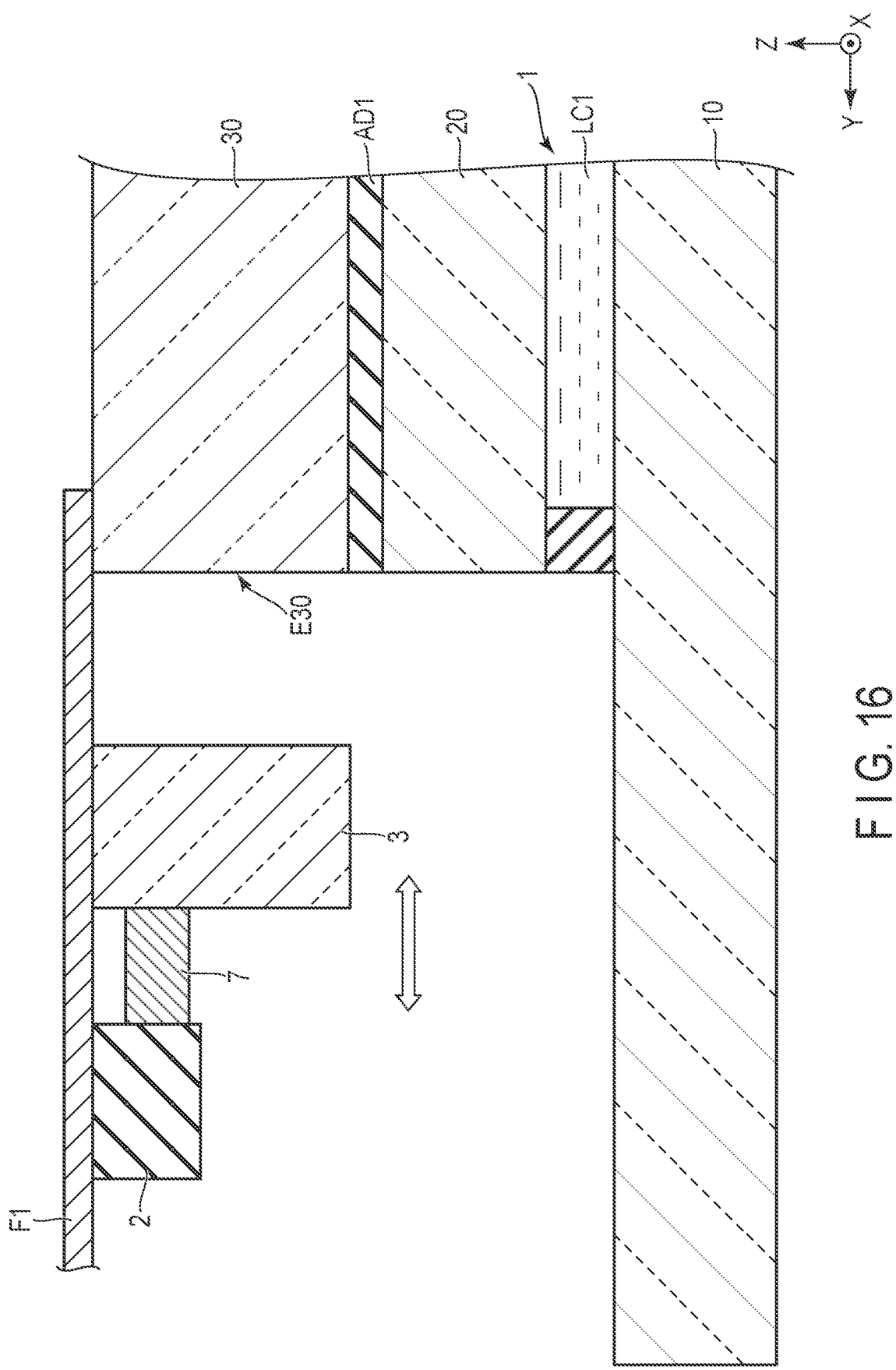
FIG. 16 is a cross-sectional view of the display device DSP in which the vicinity of an optical element 3 is shown enlarged.

FIG. 16 is a cross-sectional view of the display device DSP in which the vicinity of the optical element 3 is shown enlarged. The optical element 3 faces the end portion E30 of the third transparent substrate 30. In other words, no other member is interposed between the optical element 3 and the end portion E30. In one example, the actuator 7 is fixed to the light-emitting element 2 at one end thereof, and is fixed to the optical element 3 at the other end thereof. The actuator 7 adjusts the position in the second direction Y of the optical element 3, and thereby adjusts the distance between the light-emitting element 2 and the optical element 3. In the illustrated example, the wiring board F1 is located on the light-emitting element 2, the actuator 7 and the optical element 3, and is fixed to the third transparent substrate 30.

Figure 17A:
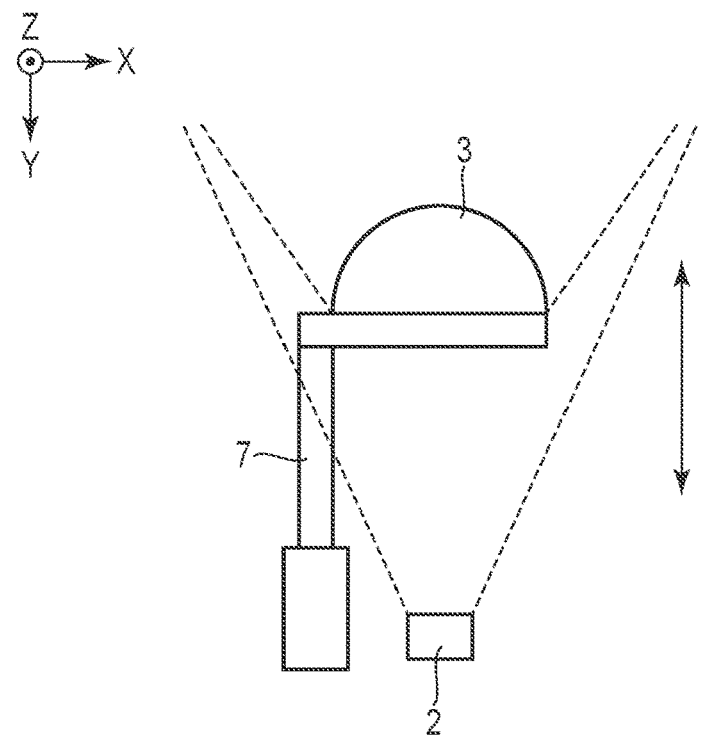
FIG. 17A is an illustration showing a case where the distance between a light-emitting element 2 and the optical element 3 is greater than the focal length of the optical element 3.
Figure 17B:
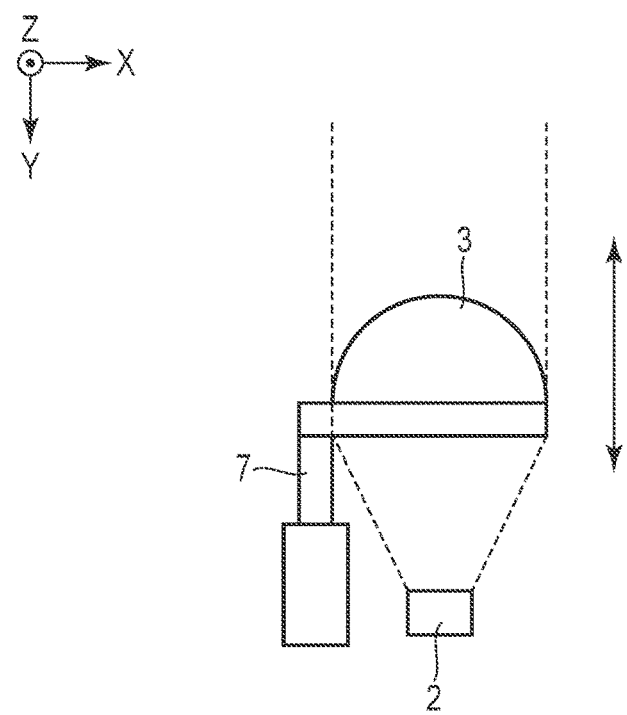
FIG. 17B is an illustration showing a state where the distance between the light-emitting element 2 and the optical element 3 is equal to the focal length of the optical element 3.

FIGS. 17A and 17B each are a plan view for explaining the operation of the actuator 7. FIGS. 17A and 17B each show a plane parallel to the X-Y plane. In the present embodiment, the optical element 3 is a cylindrical lens having a convex surface on a side far from the light-emitting element 2, for example.

In the example shown in FIG. 17A, the distance between the light-emitting element 2 and the optical element 3 is greater than the focal length of the optical element 3. In this case, the light emitted from the light-emitting element 2 spreads radially from the light-emitting element 2, and is also diffused by the optical element 3. On the other hand, in the example shown in FIG. 17B, the distance between the light-emitting element 2 and the optical element 3 is substantially equal to the focal length of the optical element 3. In this case, the light emitted from the light-emitting element 2 is converted into parallel light by the optical element 3.

As described above, also in the third embodiment, the spreading of light entering the third transparent substrate 30 can be controlled for each light-emitting element 2 according to the display state of the display panel 1, and therefore the same effects as those obtained in the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a display panel comprising a first transparent substrate, a second transparent substrate disposed on the first transparent substrate, and a first liquid crystal layer of a polymer dispersed type held between the first transparent substrate and the second transparent substrate and containing a polymer and liquid crystal molecules;
   a third transparent substrate disposed on the second transparent substrate and having a first end portion;
   a light-emitting element opposed to the first end portion; and
   a modulation element comprising a fourth transparent substrate disposed between the light-emitting element and the first end portion, a fifth transparent substrate disposed between the fourth transparent substrate and the first end portion, a second liquid crystal layer held between the fourth transparent substrate and the fifth transparent substrate, and a plurality of control electrodes for applying voltage to the second liquid crystal layer, wherein
   the second transparent substrate has a second end portion directly below the first end portion, and
   the fifth transparent substrate faces the first end portion but does not face the second end portion.

2. The display device of claim 1, wherein the control electrodes are disposed on the fourth transparent substrate, are arranged along a long side direction of the fourth transparent substrate, and extend along a short side direction of the fourth transparent substrate.

3. The display device of claim 2, comprising a plurality of the light-emitting elements arranged along the long side direction of the fourth transparent substrate, wherein the control electrodes are arranged with a first pitch, and
the light-emitting elements are arranged with a second pitch which is greater than or equal to the first pitch.

4. The display device of claim 3, wherein the second pitch is an integer multiple of the first pitch.

5. The display device of claim 1, further comprising a wiring board electrically connected to the light-emitting element and the control electrodes, wherein
the fourth transparent substrate has an extension portion extending more than the fifth transparent substrate, and
the wiring board is connected to the extension portion.

6. The display device of claim 1, further comprising an optical element located between the light-emitting element and the fourth transparent substrate and converting incident light into parallel light.

7. The display device of claim 1, further comprising a controller which controls the modulation element, wherein
the controller is configured to apply voltage to the control electrodes in order to form a lens in a region of the second liquid crystal layer which is opposed to the light-emitting element.

* * * * *